United States Patent
Chou et al.

(10) Patent No.: US 8,773,782 B2
(45) Date of Patent: Jul. 8, 2014

(54) OPTICAL LENS ASSEMBLY WITH FILTER MEMBER FOR IMAGE TAKING

(75) Inventors: Ming-Ta Chou, Taichung (TW); Tsung-Han Tsai, Taichung (TW)

(73) Assignee: Largan Precision Co., Taichung (TW)

( * ) Notice: Subject to any disclaimer, the term of this patent is extended or adjusted under 35 U.S.C. 154(b) by 459 days.

(21) Appl. No.: 13/182,826

(22) Filed: Jul. 14, 2011

(65) Prior Publication Data

US 2012/0261550 A1    Oct. 18, 2012

Related U.S. Application Data

(60) Provisional application No. 61/475,680, filed on Apr. 15, 2011.

(51) Int. Cl.
    *G02B 9/34* (2006.01)
(52) U.S. Cl.
    CPC ........................................ *G02B 9/34* (2013.01)
    USPC .............................. 359/773; 359/715; 359/723
(58) Field of Classification Search
    CPC .............. G02B 9/00; G02B 9/14; G02B 9/16; G02B 9/18; G02B 9/20; G02B 9/22; G02B 9/24; G02B 9/26; G02B 9/28; G02B 9/30; G02B 9/32; G02B 9/34; G02B 9/36; G02B 9/52; G02B 9/54; G02B 9/56; G02B 9/60; G02B 5/0294; G02B 13/004
    USPC ......... 359/644, 645, 657–661, 687, 688, 689, 359/690, 708, 709–712, 713, 714, 715, 716, 359/723, 746–748, 750–753
    See application file for complete search history.

(56) References Cited

U.S. PATENT DOCUMENTS

| | | | |
|---|---|---|---|
| 5,149,182 A | 9/1992 | Keller | |
| 6,754,009 B2 | 6/2004 | Horiuchi | |
| 7,064,909 B2 | 6/2006 | Chung | |
| 7,166,359 B2 | 1/2007 | Kriltz | |
| 7,513,704 B2 | 4/2009 | Takagi | |
| 2005/0253048 A1* | 11/2005 | Kameda | 250/226 |
| 2008/0137030 A1 | 6/2008 | Hoffman | |
| 2008/0266670 A1 | 10/2008 | Liao | |
| 2009/0009888 A1 | 1/2009 | Asami | |
| 2009/0097103 A1 | 4/2009 | Tseng et al. | |
| 2009/0290234 A1* | 11/2009 | Sano et al. | 359/715 |
| 2010/0091384 A1* | 4/2010 | Deng et al. | 359/708 |
| 2010/0220229 A1* | 9/2010 | Sano | 348/340 |

* cited by examiner

*Primary Examiner* — Darryl J Collins
*Assistant Examiner* — Gary O'Neill
(74) *Attorney, Agent, or Firm* — Wang Law Firm, Inc.; Li K. Wang; Stephen Hsu

(57) ABSTRACT

An optical lens assembly with a filter member for image taking, sequentially arranged from an object side to an image side along an optical axis, comprises: a filter member and a lens assembly. The lens assembly is set at the object side of the filter member. The lens assembly comprises at least three lens elements with refractive powers, wherein at least two lens elements are made of plastic, and have at least one aspheric object-side surface or image-side surface. By such arrangements, the optical lens assembly with a filter member for image taking can have good chromatic aberration correction and reduce the total length for applications to electronic products such as cameras and mobile phones requiring high resolution.

8 Claims, 17 Drawing Sheets

OPTICAL LENS ASSEMBLY WITH FILTER MEMBER FOR IMAGE TAKING

BACKGROUND OF THE INVENTION

1. Field of the Invention

The present invention relates to an optical lens assembly with a filter member for image taking, and more particularly to an optical lens assembly capable of filtering the infrared band of lights of a photographed object and then forming an image by an appropriately installed optical lens assembly in order to be applied to electronic products.

2. Description of the Related Art

As optical technology advances, image reception devices becomes increasingly popular, and a large number of electronic devices such as digital cameras, mobile phones, smart phones, notebook computers or tablet PCs, are disposed with the image reception devices. Therefore, users have higher demands on image reception devices for high quality and high resolution.

In an image reception device, CCD or CMOS image sensors are generally used for capturing color images of a photographed object. Since the CCD and CMOS image sensor adopts a non-continuous image taking method, the response to color is different to human eyes. The main reason resides on that the transmittance of infrared is higher than the transmittance of visible lights, so that it is necessary to remove the portion of infrared that can be detected by the image sensor but not by human eyes, while adjusting the response to color in the range of visible lights, and the color of the image can match with the feeling of human eyes. Therefore, one of the main factors for an image reception device affecting the quality of the optical lens assembly for image taking is how to filter infrared light effectively without affecting the chromatic aberration and image aberration. To prevent the color shift problem occurred after receiving the infrared light by the CCD and CMOS image sensors, the prior art generally uses a low-pass light filter (LPLF) to absorb or reflect lights of the infrared band. As disclosed in U.S. patent and publication of US2009/0009888 and U.S. Pat. No. 7,513,704, the low-pass light filter is installed between a lens assembly and an image sensor if the infrared isolation filter is used. As disclosed in U.S. Pat. No. 6,754,009, and U.S. Pat. Publication No. 2008/0266670, an infrared isolation filter is installed between the lens assemblies.

The low-pass light filter is generally made by plating a layer of coating onto blue glass or plate glass, wherein the blue glass is a glass manufactured by adding sodium oxide, magnesium oxide, calcium oxide, cobalt oxide and a small quantity of rare earth oxides for absorbing lights with a wavelength other than those of 400 nm~700 nm, or the light of different bands is adjusted according to the added metal oxide, so as to further improve the absorbing effect within the wavelength bands of UV and infrared light. The plate glass plated coating is a plated coating formed on the glass substrate for reflecting or absorbing the infrared light as disclosed in U.S. Pat. No. 7,166,359.

At present, the low-pass filter technology has been applied to sunglasses, contact glasses or measurement instruments as disclosed in U.S. Pat. No. 5,149,182 or U.S. Pat. Publication No. US2008/0137030. For applications of the optical lens assembly for image taking as disclosed in U.S. Pat. No. 7,064,909 or U.S. Pat. Publication No. US2009/0097103, a two-lens or multi-lens optical lens assembly for image taking can be used for filtering influential lights such as the infrared light and can be manufactured easily, therefore, blue glass is used directly for manufacturing the lenses. Although this method can achieve the effect of filtering the infrared light, the blue glass changes the Abbe number of the lens elements which is unfavorable for correcting chromatic aberrations and image aberrations.

In recent years, electronic products such as digital still cameras, mobile phone cameras and web cameras tend to be developed with a compact design, and users have an increasingly stricter requirement on the quality and the resolution of the image reception devices in addition to the requirement for a compact and low-cost image reception device, while meeting the requirement of an optical lens assembly for image taking with good aberration correction ability, high resolution and high image quality. The conventional optical lens assembly for image taking, an infrared isolation filter is installed, regardless of being installed between the lens assemblies or in front of the image sensor, the infrared isolation filter simply has the effect of filtering the infrared light, but the optical design of the optical lens assembly for image taking is still designed with a full spectrum, and thus the correction of the image, aberration, and color shift still require further improvements. If the infrared light is filtered and an image is formed at the image sensor, the optical design is still insufficient for a high-quality and high-resolution optical lens assembly for image taking.

Therefore, the present invention provides a more practical design and uses a front IR-filter to adjust the rear focal length appropriately and shorten the whole optical system, and adopts an absorbing filter such as the blue glass or with a coating thereof to provide a good effect of absorbing lights at the infrared band to reduce the color shift effectively. Moreover, with the appropriate design of the optical lens assembly for image taking, the length of the optical lens assembly for image taking is shortened, and a high-resolution, high-quality aberration and color shift correction capability is provided for the application to electronic products.

SUMMARY OF THE INVENTION

Therefore, it is a primary objective of the present invention to provide an optical lens assembly with a filter member for image taking, sequentially arranged from an object side to an image side comprising a filter member and a lens assembly, wherein the filter member can filter infrared light. The lens assembly is disposed at an image side of the filter member, and comprises at least three lens elements with refractive power, wherein at least two of the at least three lens elements are made of plastic with at least one aspheric object-side surface or image-side surface.

On the other hand, the present invention provides an optical lens assembly with a filter member for image taking as described above, further comprising an image sensor at an image plane, wherein the filter member comprises a blue glass that can absorb infrared light. The transmittance of the incident light with wavelengths of 750 nm~1000 nm through the filter member is smaller than 20%. The lens assembly can comprises four lens elements with refractive power, sequentially arranged from the object side to the image side: the first lens element with positive refractive power having a convex object-side surface and a convex image-side surface, the second lens element with negative refractive power having a concave object-side surface and a concave image-side surface, the third lens element with positive refractive power having a concave object-side surface and a convex image-side surface, and the fourth lens element with negative refractive power having a concave image-side surface, and at least one of the object-side surface and image-side surface thereof having at least one inflection point. The optical lens assembly satisfies one or more of the following relations:

$$TTL/\text{Img}H<2.10; \tag{1}$$

$$0.2<f_3/f<0.7; \tag{2}$$

$$-0.7<f_4/f<-0.2; \tag{3}$$

wherein, TTL is an axial distance from the object-side surface of the first lens element to the image plane, ImgH is a half of the diagonal length of an effective photosensitive area of the image sensor, f is a focal length of the optical lens assembly with a filter member for image taking, $f_3$ is a focal length of the third lens element, and $f_4$ is a focal length of the fourth lens element.

On the other hand, the present invention provides an optical lens assembly with a filter member for image taking as described above, further comprising a stop, wherein the lens assembly comprises five lens elements with refractive power, and more specifically, sequentially arranged from the object side to the image side: the first lens element with positive refractive power having a convex object-side surface, the second lens element with negative refractive power, the third lens element with negative refractive power, the fourth lens element with positive refractive power having a concave object-side surface and a convex image-side surface, the fifth lens element with negative refractive power having a concave image-side surface, and at least one of the object-side surface and image-side surface having at least one inflection point, and a filter member made of plate glass. The transmittance of the incident light with wavelengths of 750 nm~1000 nm is smaller than 20%; or the transmittance of the incident light with wavelengths of 450 nm~600 nm is greater than 60%, and the transmittance of the incident light with wavelengths of 750 nm~1000 nm is smaller than 10%. The optical lens assembly with a filter member for image taking satisfies one or more of the following relations:

$$30<v_1-v_2<40; \tag{4}$$

$$0.05<FT<0.50; \tag{5}$$

$$0<D_1<0.60; \tag{6}$$

$$|f/f_3|<0.7; \tag{7}$$

$$0.7<SL/TTL<1.10; \tag{8}$$

wherein, $v_1$ is an Abbe number of the first lens element, $v_2$ is an Abbe number of the, FT is a central thickness (unit in mm) of the filter member, $D_1$ is an axial distance (unit in mm) between the filter member and the first lens element, f is a focal length of the optical lens assembly with a filter member for image taking, $f_3$ is a focal length of the third lens element, SL is an axial distance between the stop and the image plane, and TTL is an axial distance from the object-side surface of the first lens element to the image plane.

Another objective of the present invention is to provide an optical lens assembly with a filter member for image taking, comprising a lens assembly and a filter member, wherein the lens assembly comprises at least three lens elements with refractive power, and at least two of the lens elements are made of plastic having at least one of aspheric object-side surface or image-side surface. The filter member comprises a blue glass that can absorb infrared light.

On the other hand, the present invention provides an optical lens assembly with a filter member for image taking as described above, wherein the filter member is disposed at the object side of the lens assembly, and the present invention further comprises an image sensor at the image plane. The transmittance of the incident light with wavelengths of 750 nm~1000 nm is smaller than 20%; or additionally, the transmittance of the incident light with wavelengths of 450 nm~600 nm is greater than 60%, and the transmittance of the incident light with wavelengths of 750 nm~1000 nm is smaller than 10%. The optical lens assembly comprises four lens elements with refractive power, sequentially arranged from the object side to the image side: the filter member, the first lens element with positive refractive power having a convex object-side surface, the second lens element with negative refractive power, the third lens element with positive refractive power having a concave object-side surface and a convex image-side surface, and the fourth lens element with negative refractive power having a concave image-side surface, and at least one of the object-side surface and image-side surface thereof having at least one inflection point. The optical lens assembly satisfies one or more of the following relations:

$$TTL/\text{Img}H<2.10; \tag{1}$$

$$\text{additionally, } TTL/\text{Img}H<1.85; \tag{9}$$

$$0.05<FT<0.50; \tag{5}$$

$$0<D_1<0.60; \tag{6}$$

$$30<v_1-v_2<40; \tag{4}$$

wherein, TTL is an axial distance from the object-side surface of the first lens element to the image plane, ImgH is a half of the diagonal length of an effective photosensitive area of the image sensor, FT is a central thickness (unit in mm) of the filter member, $D_1$ is an axial distance (unit in mm) between the filter member and the first lens element, $v_1$ is an Abbe number of the first lens element, and $v_2$ is an Abbe number of the second lens element.

On the other hand, the present invention provides an optical lens assembly with a filter member for image taking as described above, wherein the lens assembly comprises five lens elements with refractive power, and more specifically, sequentially arranged from the object side to the image side: the first lens element with positive refractive power having a convex object-side surface, the second lens element with negative refractive power, the third lens element with negative refractive power, the fourth lens element with positive refractive power having a concave object-side surface and a convex image-side surface, and the fifth lens element with negative refractive power having a concave image-side surface, and at least one of the object-side surface and image-side surface thereof having at least one inflection point.

In the present invention, the aforementioned filter member and properly configured lens assembly are installed with an appropriate interval apart along the optical axis to achieve a good aberration correction and a more advantageous modulation transfer function (MTF) in the condition of a larger view angle.

In the optical lens assembly with a filter member for image taking of the present invention, the filter member is disposed between the photographed object and the lens assembly to reduce the rear focal length of the system effectively, so as to reduce the total length of the optical lens assembly with a filter member for image taking. If the filter member is further made of blue glass capable of filtering infrared light, reduces the reflections effectively. In addition, the filter member made of blue glass can waive the secondary reflection to lower or eliminate the flare phenomenon effectively.

In the optical lens assembly, the first lens element with positive refractive power provides a portion of required refractive power to facilitate shortening the total length of the optical system, and the second lens element with negative refractive power corrects the aberration produced by the lens elements with positive refractive power effectively. If the first lens element has a convex object-side surface, the view angle of the system can be enlarged, and the refraction of the incident light can be mild to avoid a too-large increase of the aberration, so that an appropriate installation can be achieved to favor the great view angle and aberration correction.

Moreover, in the optical lens assembly with a filter member for image taking of the present invention, the third lens element with positive refractive power can effectively match with the first lens element with positive refractive power to reduce the error sensitivity of the system and facilitate the manufacture of the lenses. In addition, the fourth lens element with negative refractive power can provide a portion of negative refractive power to the optical lens assembly with a filter member for image taking to correct the high level aberration of the system effectively. In addition, if the third lens element has a convex image-side surface, the astigmatism and high level aberration can be corrected effectively.

If the lens assembly is comprised of five lens elements with refractive power including a combination of the fourth lens element with negative refractive power and the fifth lens element with positive refractive power, the optical lens assembly with a filter member for image taking can have the telescopic effect, and the rear focal length can be shortened to reduce the total length. In addition, if the fourth lens element has a concave object-side surface and a convex image-side surface, the astigmatism and high level aberration can be corrected effectively. Further, the curvature at the periphery of the image-side surface of the fourth lens element is greater than the curvature at the middle, such that the light at the periphery of the system can be controlled to an angle and projected onto the image sensor, such that the light sensitivity of the system can be enhanced.

In the optical lens assembly with a filter member for image taking of the present invention, a stop can provide a longer distance between an exit pupil of the optical lens assembly with a filter member for image taking and the image plane, and the light of an image can be projected directly and received by an image sensor to avoid dark corners and achieve the telecentric effect on the image side. In general, the telecentric effect can improve the brightness of the image plane and enhance the efficiency of receiving images by the CCD or CMOS image sensor.

If an inflection point is designed at a position at the lens element nearest to the image plane, the light of an image can be guided with an angle out from the edges of the lens elements, such that the light of an image at the off-axis view angle is guided to the image sensor and received by the image sensor. If the lens element nearest to the image plane has a concave image-side surface, the principal point of the optical lens assembly with a filter member for image taking is situated at a position away from the image plane to facilitate shortening the total length of the optical system and miniaturizing the lens.

DETAILED DESCRIPTION OF THE PREFERRED EMBODIMENTS

Figure 1A:
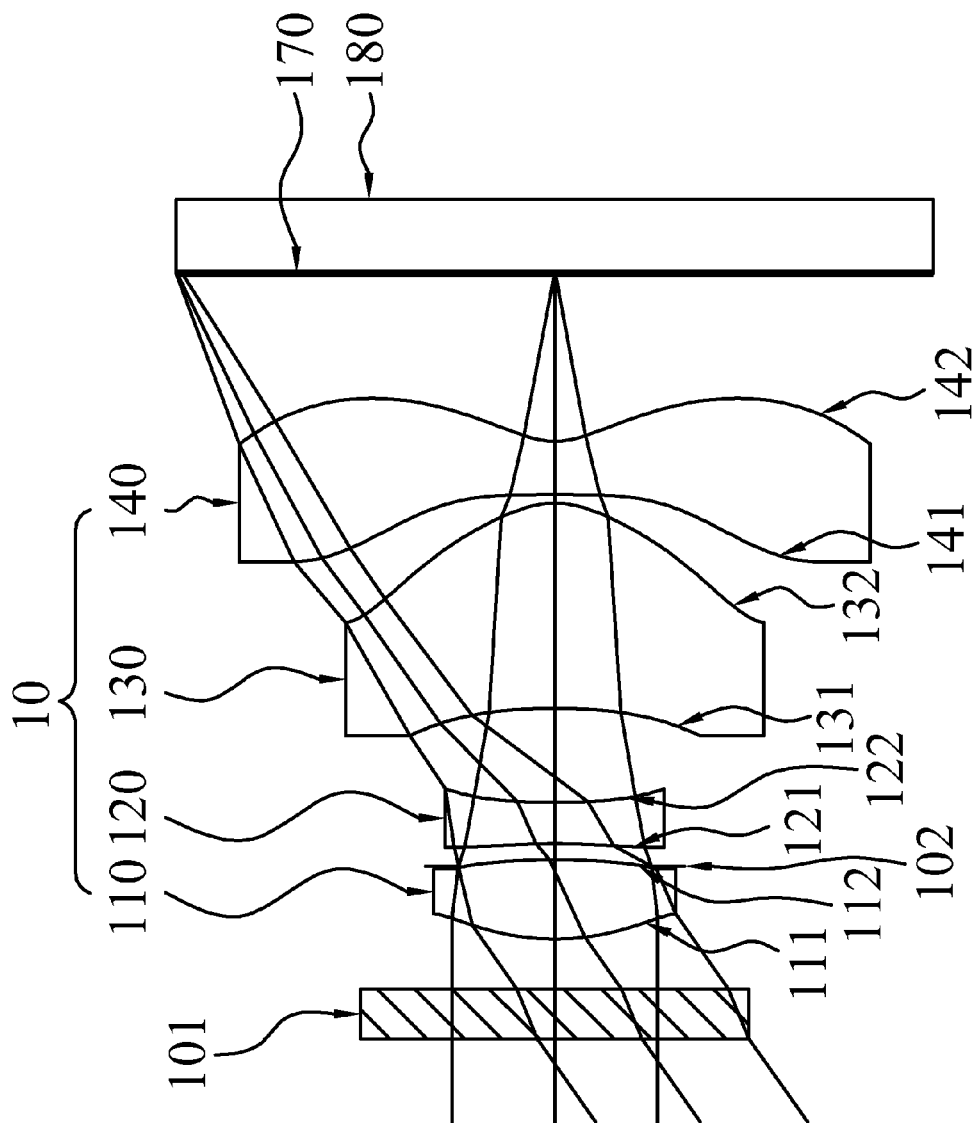
FIG. 1A is a schematic view of an optical lens assembly with a filter member for image taking in accordance with the first preferred embodiment of the present invention.

With reference to FIG. 1A for an optical lens assembly with a filter member for image taking of the present invention, the optical lens assembly with a filter member for image taking, sequentially arranged from an object side to an image side along an optical axis, comprises a filter member 101 and a lens assembly 10. The filter member 101 is made of plate glass for filtering infrared light. The lens assembly 10, sequentially arranged from the object side to the image side along the optical axis, comprises: the first lens element 110, the second lens element 120, the third lens element 130 and the fourth lens element 140, wherein the first lens element 110 with positive refractive power has a convex object-side surface 111 and a convex image-side surface 112; the second lens element 120 with negative refractive power has a concave object-side surface 121 and a concave image-side surface 122; the third lens element 130 with positive refractive power has a concave object-side surface 131 and a convex image-side surface 132; the fourth lens element 140 with negative refractive power has a concave image-side surface 142, and at least one of the object-side surface 141 and image-side surface 142 thereof has at least one inflection point. The optical lens assembly with a filter member for image taking further comprises a stop and an image sensor 180 at the image plane 170 for imaging a photographed object. The stop can be an aperture stop 102 which is a middle aperture stop disposed between the first lens element 110 and the second lens element 120.

Figure 4A:
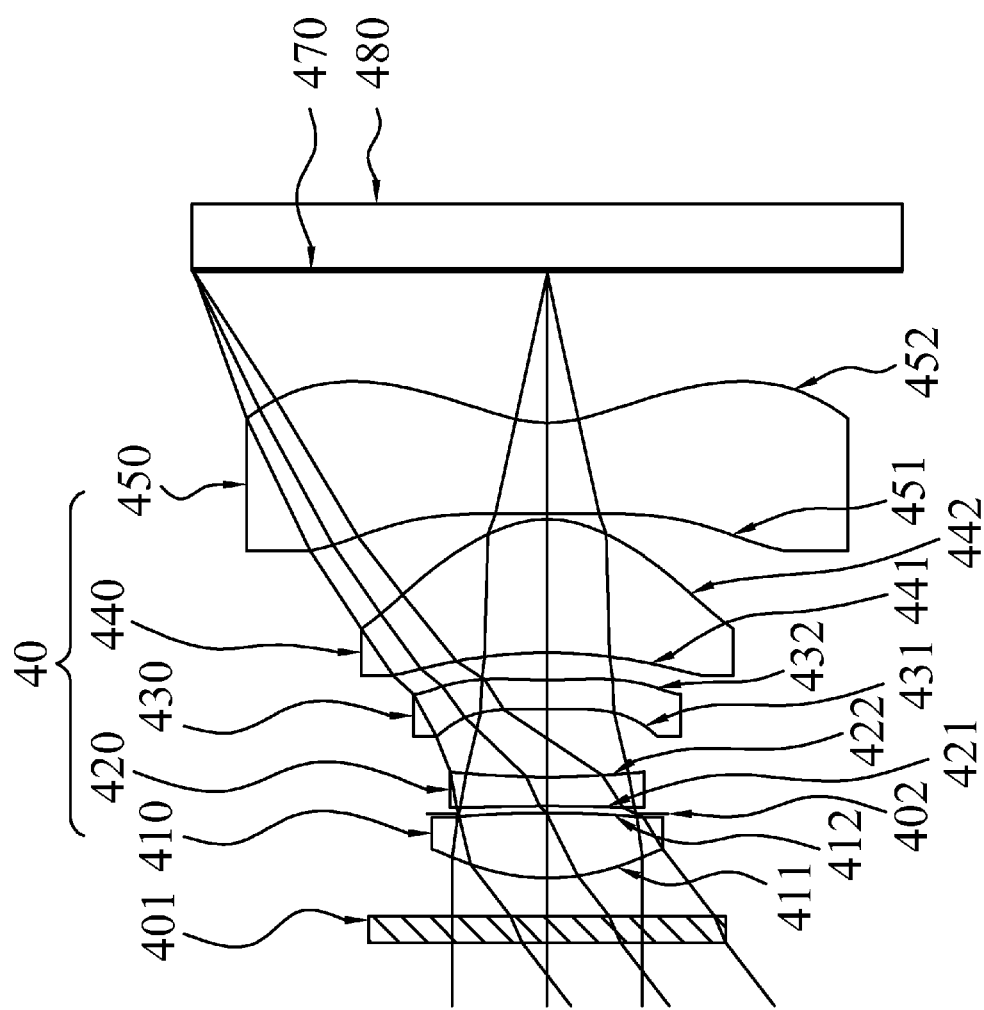
FIG. 4A is a schematic view of an optical lens assembly with a filter member for image taking in accordance with the fourth preferred embodiment of the present invention.

With reference to FIG. 4A for an optical lens assembly with a filter member for image taking in accordance with the present invention besides, the optical lens assembly with a filter member for image taking, sequentially arranged from an object side to an image side along an optical axis, comprises: a filter member 401 and a lens assembly 40. The filter member 401 is made of plate glass and filter infrared light. The lens assembly 40 sequentially arranged from the object side to the image side along the optical axis comprises: the first lens element 410, the second lens element 420, the third lens element 430, the fourth lens element 440 and the fifth lens element 450; wherein the first lens element 410 with positive refractive power has a convex object-side surface 411; the second lens element 420 with negative refractive power; third lens element 430 with negative refractive power; fourth lens element 440 with positive refractive power has a concave object-side surface 441 and a convex image-side surface 442; and the fifth lens element 450 with negative refractive power has a concave image-side surface 452, and at least one of the object-side surface 451 and the image-side surface 452 thereof has at least one inflection point. The optical lens assembly with a filter member for image taking further comprises a stop and an image sensor 480 at the image plane 470 for imaging a photographed object. The stop can be an aperture stop 402 which is a middle aperture stop disposed between the first lens element 410 and the second lens element 420.

Figure 7A:
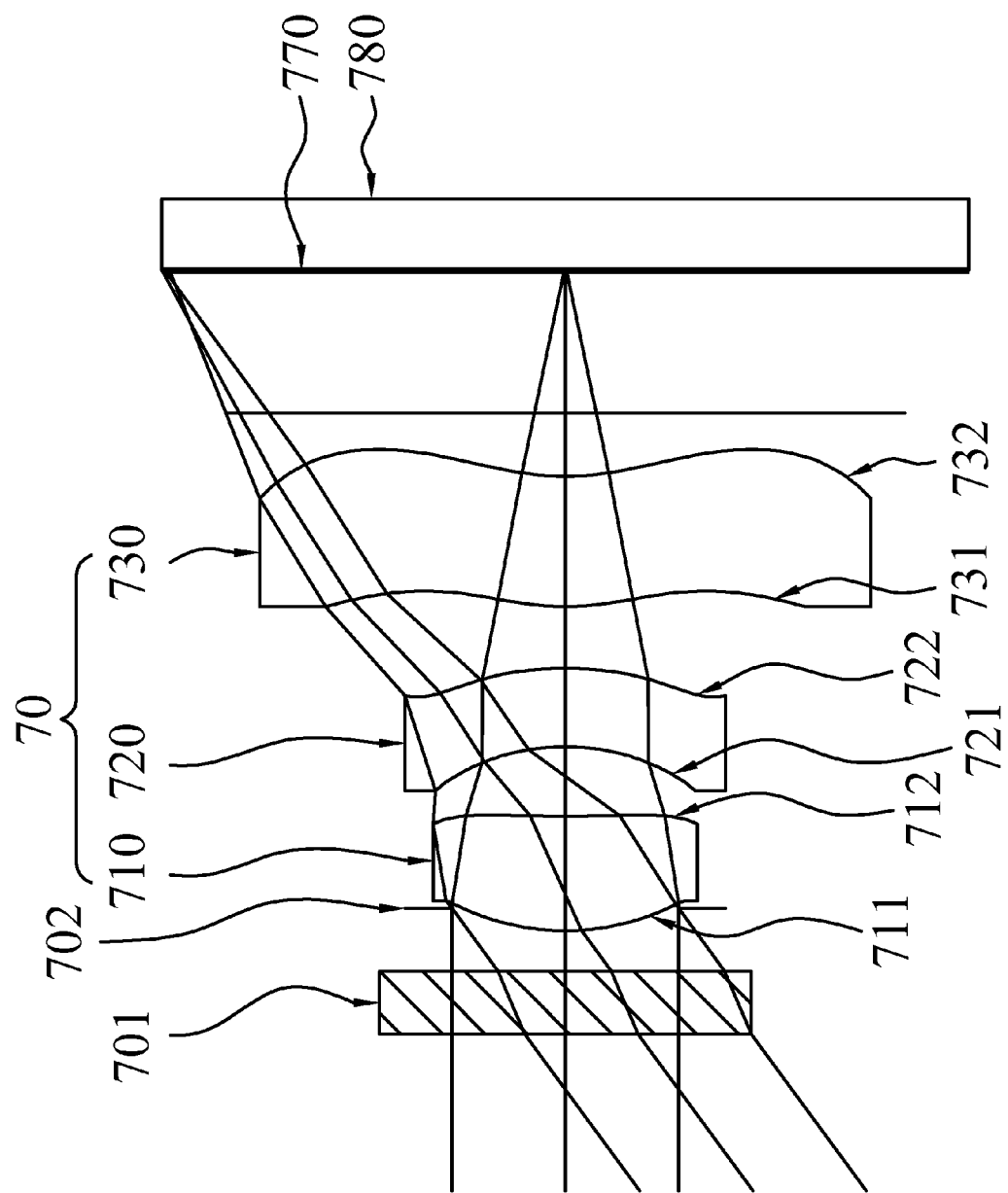
FIG. 7A is a schematic view of an optical lens assembly with a filter member for image taking in accordance with the seventh preferred embodiment of the present invention.

With reference to FIG. 7A for an optical lens assembly with a filter member for image taking in accordance with the seventh preferred embodiment of the present invention, the optical lens assembly with a filter member for image taking sequentially arranged from an object side to an image side along an optical axis comprises: a filter member 701 and a lens assembly 70. The filter member 701 is made of plate glass for filtering infrared light. The lens assembly 70, sequentially arranged from an object side to an image side along an optical axis comprises: the first lens element 710, the second lens element 720 and the third lens element 730; wherein the first lens element 710 comes with positive refractive power; the second lens element 720 comes with negative refractive power; the third lens element 730 comes with refractive power; and the optical lens assembly with a filter member for image taking further comprises an aperture stop 702 which is a front aperture stop installed between a photographed object and the first lens element 710 and an image sensor 780 installed at the image plane 770 for imaging the photographed object.

In the optical lens assembly with a filter member for image taking of the present invention as mentioned above, if the lens element has a convex surface, it shows that the surface of the lens element in proximity to the optical axis is convex; if the surface of the lens element is concave, it shows that the surface of the lens element in proximity to the optical axis is concave.

In the meantime, the aforementioned first lens element 110, second lens element 120, third lens element 130, fourth lens element 140 and fifth lens element 150 come with aspheric optical surface in compliance with the aspherical surface formula as given in Equation (10):

$$X(Y) = \frac{(Y^2/R)}{1 + \sqrt{(1-(1+K)(Y/R)^2)}} + \sum_i (A_i) \cdot (Y^i) \quad (10)$$

wherein, X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

In the optical lens assembly with a filter member for image taking of the present invention, the first lens element 110, second lens element 120, third lens element 130, fourth lens element 140, and fifth lens element 150 can be spheric or aspheric surfaces, and if aspheric optical surfaces are adopted, then the radius of curvature of the optical surface can be used for changing the refractive power to reduce or eliminate aberrations, so as to decrease the number of lens elements used in the optical lens assembly with a filter member for image taking and shorten the total length of the optical lens assembly with a filter member for image capture.

In the optical lens assembly with a filter member for image taking of the present invention, with the installation filter member 101, the incident light with wavelengths of 750 nm~1000 nm passing through the filter member 101 has a transmittance smaller than 20%; or the incident light with wavelengths of 450 nm~600 nm passing through the filter member 101 has a transmittance greater than 60%, and the incident light with wavelengths of 750 nm~1000 nm has a transmittance smaller than 10% to reduce the color shift effectively.

If the relation (1) is satisfied, the total length TTL of the optical lens assembly with a filter member for image taking can be reduced effectively, such that that a larger effective pixel range of the image sensor can be achieved within the same total length TTL. If the relations (2) and (3) are satisfied, in other words, the refractive powers are allocated appropriately among the focal length f of the optical lens assembly with a filter member for image taking, the focal length $f_3$ of the third lens element 130, and the focal length $f_r$ of the fourth lens element 140, the sensitivity of the optical lens assembly with a filter member for image taking can be controlled and lowered to correct high level aberrations.

In the optical lens assembly with a filter member for image taking of the present invention, if the relation (4) is satisfied, such that the difference of the Abbe number $v_1$ of the first lens element 110 and the Abbe number $v_2$ of the second lens element 120 falls within an appropriate range, the chromatic aberration produced by the first lens element 110 and the second lens element 120 can be corrected effectively, and the chromatic aberration compensation capability of the second lens 120 can be enhanced. If the central thickness FT of the filter member 101 is controlled (to the relation 5), the effect of absorbing the infrared band of the incident light can be adjusted appropriately, and the filter member 101 has an appropriate thickness to facilitate shortening the total length of the optical lens assembly with a filter member for image taking.

If the axial distance $D_1$ between the filter member 101 and the first lens element 110 is limited (to the relation 6), the total length of the optical lens assembly with a filter member for image taking can be adjusted appropriately; and if the relation (8) is satisfied, a good balance between the telecentric property of the optical lens assembly with a filter member for image taking and a wider view angle can be obtained, and the total length of the optical lens assembly with a filter member for image taking can be shortened effectively.

The optical lens assembly with a filter member for image taking of the present invention is described by preferred embodiments and related drawings in details as follows.

First Preferred Embodiment

Figure 1B:
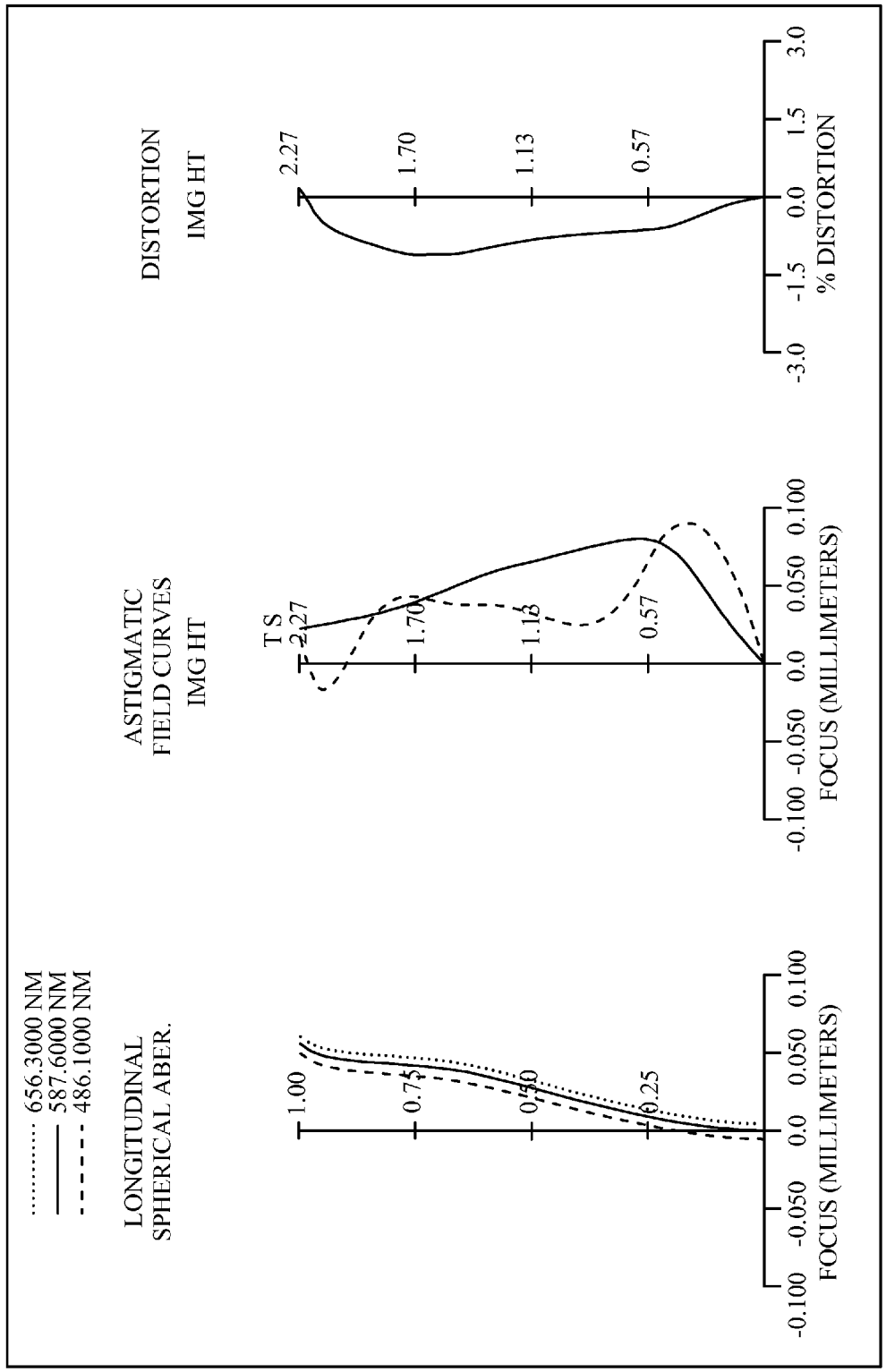
FIG. 1B is a series of aberration curves of the first preferred embodiment of the present invention.

With reference to FIGS. 1A and 1B for a schematic view of an optical lens assembly with a filter member for image taking and a series of aberration curves in accordance with the first preferred embodiment of the present invention respectively, the optical lens assembly with a filter member for image taking primarily comprises four lens elements, an aperture stop 102 and a filter member 101. More specifically, the optical lens assembly with a filter member for image taking, sequentially arranged from an object side to an image side along an optical axis, comprises: the filter member 101 made of plate blue glass for filtering infrared light; the plastic first lens element 110 with positive refractive power having a convex object-side surface 111 and a convex image-side surface 112, and both object-side surface 111 and image-side surface 112 thereof being aspheric; the aperture stop 102; the plastic second lens element 120 with negative refractive power having a concave object-side surface 121 and a concave image-side surface 122, and both object-side surface 121 and image-side surface 122 being aspheric; the plastic third lens element 130 with positive refractive power having a concave object-side surface 131 and a convex image-side surface 132, and both object-side surface 131 and image-side surface 132 thereof being aspheric; the plastic fourth lens element 140 with negative refractive power having a concave object-side surface 141 and a concave image-side surface 142, both object-side surface 141 and image-side surface 142 thereof being aspheric, and at least one of the object-side surface 141 and image-side surface 142 thereof having at least one inflection point; an image sensor 180 at an image plane 170. With a combination of the lens assembly 10 having four lens elements, the aperture stop 102 and the filter member 101, an image of a photographed object can be formed onto the image sensor 180.

TABLE 1

Optical data of this preferred embodiment
f = 3.21 mm, Fno = 2.60, HFOV = 35.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.300 | Glass | 1.527 | 64.2 | — |
| 2 | | Plano | 0.300 | (Blue Glass) | | | |
| 3 | Lens 1 | 1.457340 (ASP) | 0.478 | Plastic | 1.544 | 55.9 | 1.97 |
| 4 | | −3.553800 (ASP) | −0.040 | | | | |
| 5 | Ape. Stop | Plano | 0.135 | | | | |
| 6 | Lens 2 | −3.469100 (ASP) | 0.250 | Plastic | 1.634 | 23.8 | −3.46 |
| 7 | | 6.141500 (ASP) | 0.565 | | | | |
| 8 | Lens 3 | −3.043300 (ASP) | 1.235 | Plastic | 1.544 | 55.9 | 0.86 |
| 9 | | −0.462650 (ASP) | 0.050 | | | | |
| 10 | Lens 4 | −50.000000 (ASP) | 0.320 | Plastic | 1.535 | 56.3 | −0.70 |
| 11 | | 0.377830 (ASP) | 0.500 | | | | |
| 12 | Image | Plano | 0.511 | | | | |
| 13 | | Plano | — | | | | |

Note:
Reference wavelength is 587.6 nm. ASP stands for aspherical surfaces.

The optical data of this preferred embodiment are listed in Table 1, wherein the object-side surfaces and the image-side surfaces of the first lens element 110 to the fourth lens element 140 comply with the aspherical surface formula as given in Equation (10), and their aspheric coefficients are listed in Table 2 as follows:

TABLE 2

Aspheric coefficients of this preferred embodiment

| Surface # | 3 | 4 | 6 | 7 |
|---|---|---|---|---|
| k = | −1.07847E+01 | 1.00000E+00 | 0.00000E+00 | −6.64801E+00 |
| A4 = | 4.01933E−01 | 1.48985E−01 | 5.15964E−01 | 3.86858E−01 |
| A6 = | −8.57770E−01 | −3.90278E−01 | −1.52131E+00 | −7.44876E−01 |
| A8 = | 1.26682E+00 | −9.12930E−01 | 4.55162E+00 | 1.87321E+00 |
| A10 = | −1.44703E+00 | 3.39815E+00 | −1.45374E+01 | −3.87556E+00 |
| A12 = | 1.72092E−01 | −5.65123E+00 | 2.92496E+01 | 5.18075E+00 |
| A14 = | −3.71327E−01 | 4.08908E+00 | −2.22715E+01 | −1.93765E+00 |

| Surface # | 8 | 9 | 10 | 11 |
|---|---|---|---|---|
| k = | −1.00000E+01 | −5.32044E+00 | −1.00000E+01 | −5.95095E+00 |
| A4 = | 3.91830E−02 | −4.45877E−01 | −3.82515E−01 | −2.20284E−01 |
| A6 = | −5.78520E−01 | 6.35459E−01 | 2.03460E−01 | 1.54006E−01 |

TABLE 2-continued

Aspheric coefficients of this preferred embodiment

| | | | | |
|---|---|---|---|---|
| A8 = | 7.32523E−01 | −7.15533E−01 | 3.15344E−03 | −7.76986E−02 |
| A10 = | 2.56081E−01 | 4.76345E−01 | −3.30044E−02 | 2.48979E−02 |
| A12 = | −1.40816E+00 | −1.36620E−01 | 1.07782E−02 | −4.56601E−03 |
| A14 = | 9.36726E−01 | 1.16735E−02 | −1.14342E−03 | 3.58425E−04 |

With reference to Table 1 and the series of aberration curves as shown in FIG. 1B for the optical lens assembly with a filter member for image taking in accordance with this preferred embodiment, the focal length of the optical lens assembly for image capture is f=3.21 (mm), the overall aperture value (f-number) of the optical lens assembly for image capture is Fno=2.60, the half of maximum view angle is HFOV=35.0°. After the optical data of this preferred embodiment are calculated and derived, the optical lens assembly satisfies related relations as shown in Table 3 below, and the related symbols have been described above and thus will not be described again.

TABLE 3

Data of related relations of this preferred embodiment

| Relation | Data |
|---|---|
| $v_1 - v_2$ | 32.1 |
| FT | 0.30 |
| $D_1$ | 0.30 |
| $f_3/f$ | 0.27 |
| $|f/f_3|$ | 3.74 |
| $f_4/f$ | 0.22 |
| SL/TTL | 0.89 |
| TTL/ImgH | 1.77 |

According to the optical data as shown in Table 1 and the series of aberration curves as shown in FIG. 1B, the optical lens assembly with a filter member for image taking in accordance with this preferred embodiment of the present invention provides good correction results in aspects of the longitudinal spherical aberration, astigmatic field curving, and distortion.

Second Preferred Embodiment

Figure 2A:
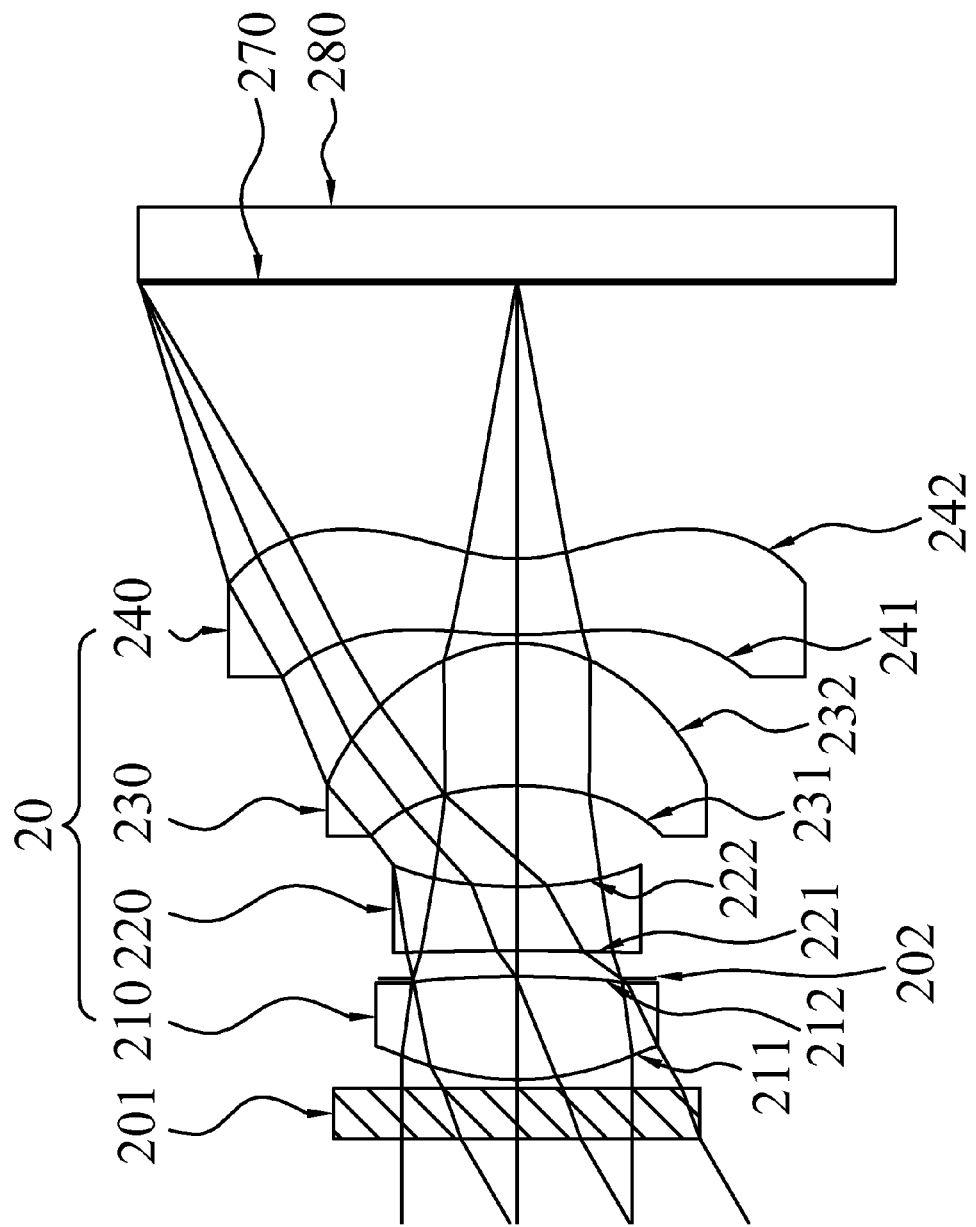
FIG. 2A is a schematic view of an optical lens assembly with a filter member for image taking in accordance with the second preferred embodiment of the present invention.
Figure 2B:
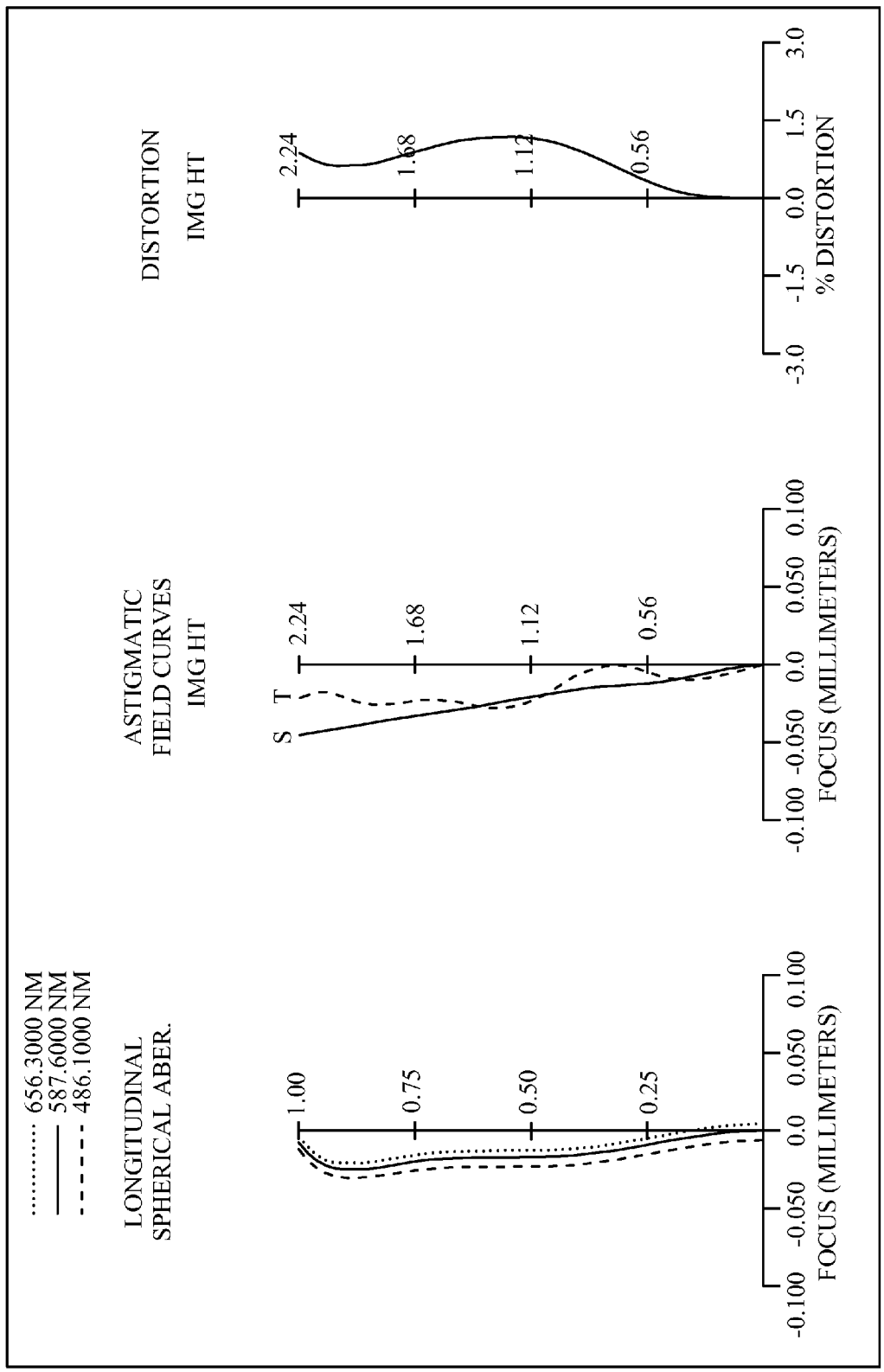
FIG. 2B is a series of aberration curves of the second preferred embodiment of the present invention.

With reference to FIGS. 2A and 2B for a schematic view of an optical lens assembly with a filter member for image taking and a series of aberration curves in accordance with the second preferred embodiment of the present invention respectively, the optical lens assembly with a filter member for image taking mainly comprises four lens elements, an aperture stop 202 and a filter member 201. More specifically, the optical lens assembly with a filter member for image taking, sequentially arranged from an object side to an image side along an optical axis, comprises: the filter member 201 made of plate blue glass for filtering infrared light; the plastic first lens element 210 with positive refractive power having a convex object-side surface 211 and a convex image-side surface 212, and both object-side surface 211 and image-side surface 212 thereof being aspheric; the aperture stop 202; the plastic second lens element 220 with negative refractive power having a concave object-side surface 221 and a concave image-side surface 222, and both object-side surface 221 and image-side surface 222 being aspheric; the plastic third lens element 230 with positive refractive power having a concave object-side surface 231 and a convex image-side surface 232, and both object-side surface 231 and image-side surface 232 thereof being aspheric; the plastic fourth lens element 240 with negative refractive power having a convex object-side surface 241 and a concave image-side surface 242, both object-side surface 241 and image-side surface 242 thereof being aspheric, and at least one of the object-side surface 241 and image-side surface 242 thereof having at least one inflection point; an image sensor 280 at an image plane 270. With a combination of the lens assembly 20 having four lens elements, the aperture stop 202 and the filter member 201, an image of a photographed object can be formed onto the image sensor 280.

TABLE 4

Optical data of this preferred embodiment
f = 3.85 mm, Fno = 2.82, HFOV = 30.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.300 | Glass | 1.527 | 64.2 | — |
| 2 | | Plano | 0.050 | (Blue Glass) | | | |
| 3 | Lens 1 | 1.648970 (ASP) | 0.610 | Plastic | 1.544 | 55.9 | 2.48 |
| 4 | | −6.453500 (ASP) | −0.012 | | | | |
| 5 | Ape. Stop | Plano | 0.166 | | | | |
| 6 | Lens 2 | −10.655100 (ASP) | 0.380 | Plastic | 1.632 | 23.4 | −3.64 |
| 7 | | 2.978290 (ASP) | 0.597 | | | | |
| 8 | Lens 3 | −1.745370 (ASP) | 0.845 | Plastic | 1.544 | 55.9 | 2.42 |
| 9 | | −0.878410 (ASP) | 0.050 | | | | |
| 10 | Lens 4 | 2.713550 (ASP) | 0.450 | Plastic | 1.530 | 55.8 | −3.13 |
| 11 | | 0.970350 (ASP) | 0.533 | | | | |
| 12 | Image | Plano | 1.107 | | | | |
| 13 | | Plano | — | | | | |

Note:
Reference wavelength is 587.6 nm. ASP stands for aspherical surfaces.

The optical data of this preferred embodiment are listed in Table 4, wherein the object-side surfaces and the image-side surfaces of the first lens element 210 to the fourth lens element 240 comply with the aspherical surface formula as given in Equation (10), and their aspheric coefficients are listed in Table 5 as follows:

TABLE 5

Aspheric coefficients of this preferred embodiment

| Surface # | 3 | 4 | 6 | 7 |
|---|---|---|---|---|
| k = | −3.67829E−01 | 3.20849E+01 | −1.00000E+00 | 6.76856E−01 |
| A4 = | 3.39435E−03 | 2.67772E−02 | 1.03261E−01 | 1.39908E−01 |
| A6 = | −7.17988E−02 | −4.77291E−02 | −1.38113E−01 | −7.40642E−02 |
| A8 = | 1.36696E−01 | −2.10480E−01 | −9.91399E−02 | 5.43810E−02 |
| A10 = | −1.92463E−01 | 1.81353E−01 | 1.47911E−01 | 0.00000E+00 |
| A12 = | | | | |
| A14 = | | | | |

| Surface # | 8 | 9 | 10 | 11 |
|---|---|---|---|---|
| k = | −2.88540E−01 | −1.04215E+00 | −1.00000E+00 | −5.58851E+00 |
| A4 = | −1.93299E−03 | 1.32233E−01 | −3.27788E−01 | −1.91802E−01 |
| A6 = | −1.66772E−01 | −3.44376E−01 | 1.35071E−01 | 9.47546E−02 |
| A8 = | −3.06011E−01 | 3.14209E−01 | −3.29903E−02 | −3.67465E−02 |
| A10 = | 6.78832E−01 | −1.87695E−01 | 1.39907E−02 | 6.95813E−03 |
| A12 = | 2.74215E−01 | 6.03733E−03 | −4.53802E−03 | 4.19682E−04 |
| A14 = | −1.64570E+00 | 7.54876E−02 | −2.28692E−03 | −4.94227E−04 |
| A16 = | 1.02935E+00 | −3.99526E−02 | 9.71196E−04 | 6.39773E−05 |

With reference to Table 4 and the series of aberration curves as shown in FIG. 2B for the optical lens assembly with a filter member for image taking in accordance with this preferred embodiment, the focal length of the optical lens assembly for image capture is f=3.85 (mm), the overall aperture value (f-number) of the optical lens assembly for image capture is Fno=2.82, the half of maximum view angle is HFOV=30.1°. After the optical data of this preferred embodiment are calculated and derived, the optical lens assembly satisfies related relations as shown in Table 6 below, and the related symbols have been described above and thus will not be described again.

TABLE 6

Data of related relations of this preferred embodiment

| Relation | Data |
|---|---|
| $v_1-v_2$ | 32.5 |
| FT | 0.30 |
| $D_1$ | 0.05 |
| $f_3/f$ | 0.63 |
| $|f/f_3|$ | 1.59 |
| $f_4/f$ | −0.81 |
| SL/TTL | 0.87 |
| TTL/ImgH | 2.11 |

According to the optical data as shown in Table 4 and the series of aberration curves as shown in FIG. 2B, the optical lens assembly with a filter member for image taking in accordance with this preferred embodiment of the present invention provides good correction results in aspects of the longitudinal spherical aberration, astigmatic field curving, and distortion.

Third Preferred Embodiment

Figure 3A:
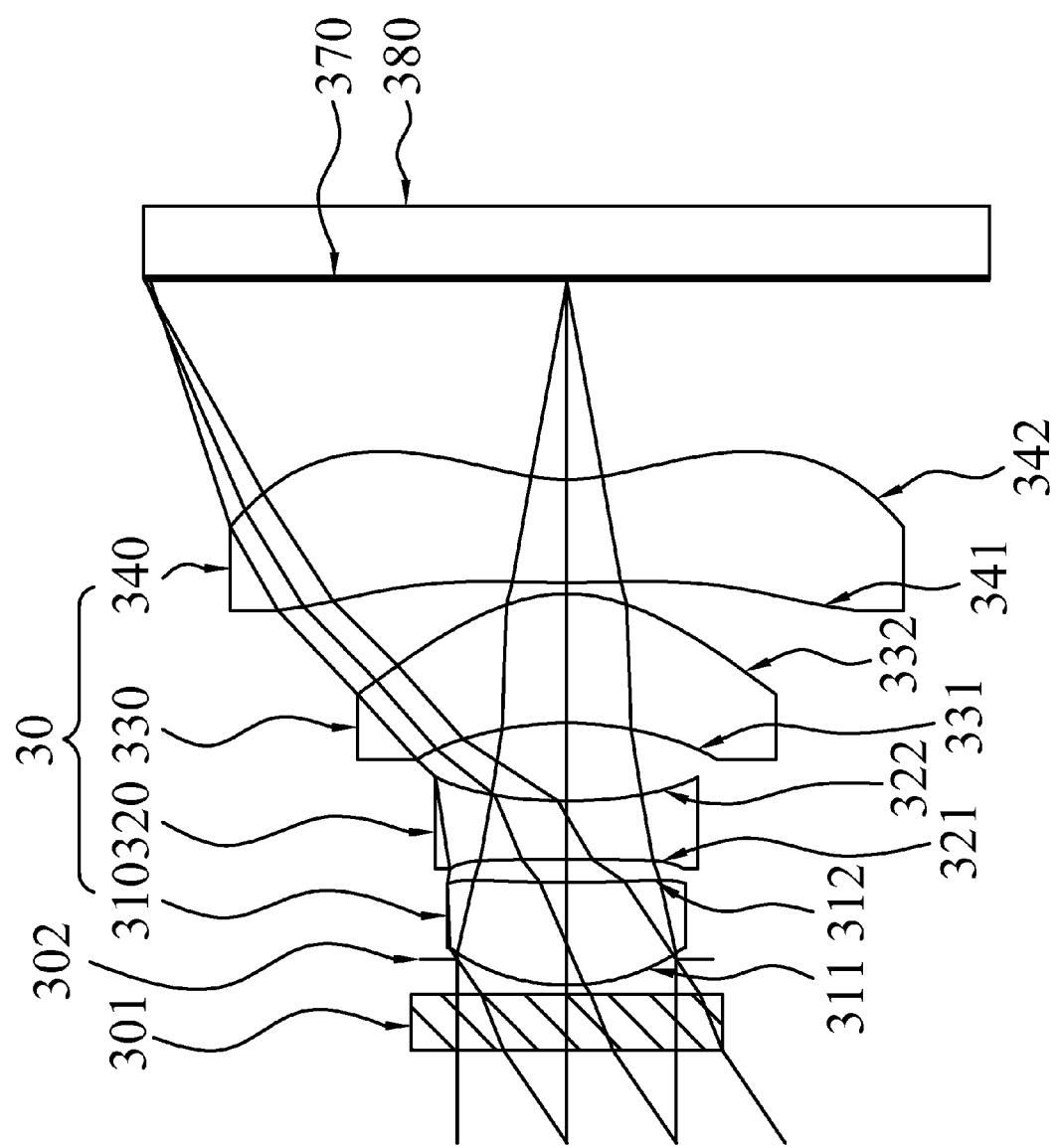
FIG. 3A is a schematic view of an optical lens assembly with a filter member for image taking in accordance with the third preferred embodiment of the present invention.
Figure 3B:
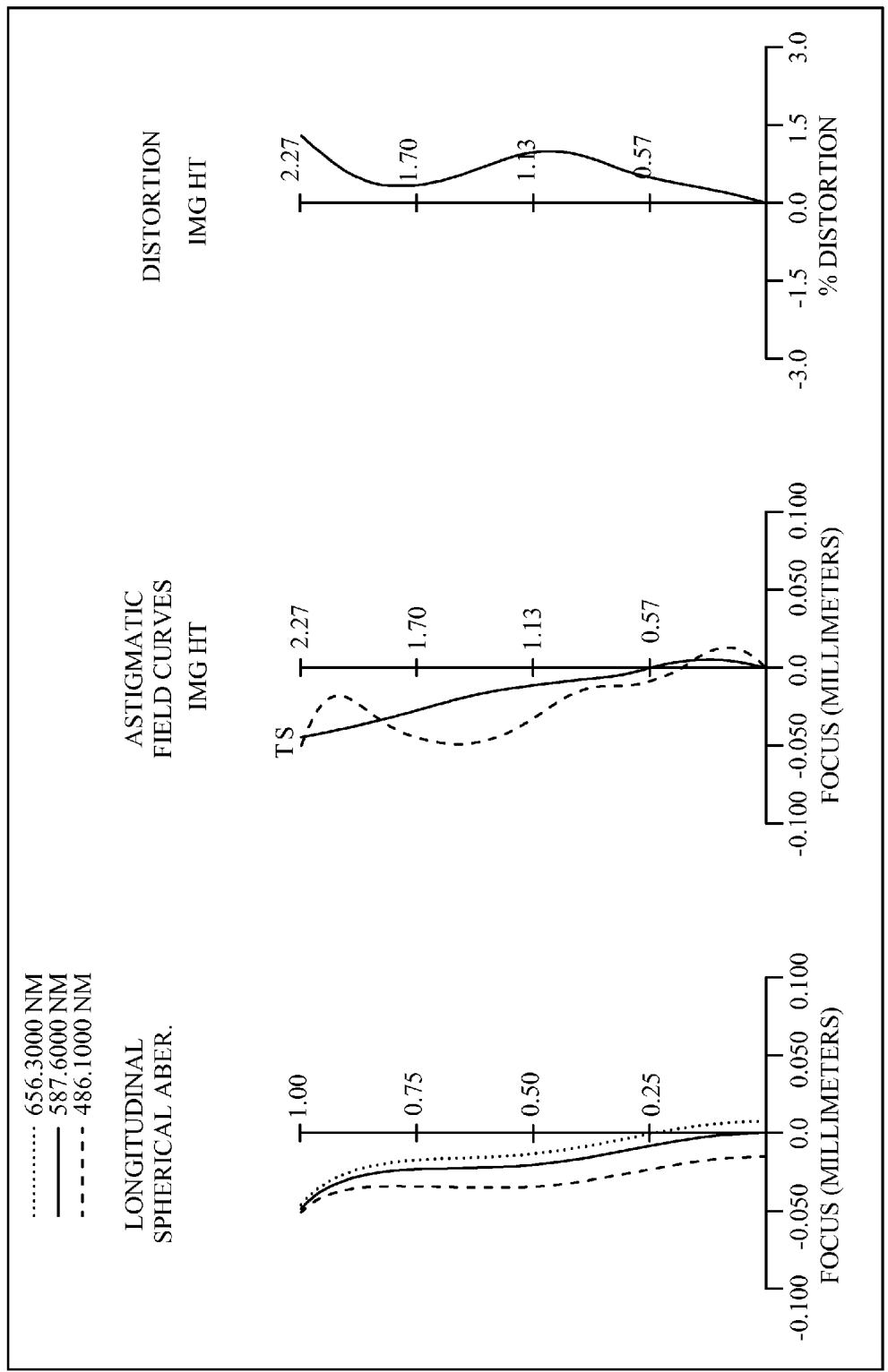
FIG. 3B is a series of aberration curves of the third preferred embodiment of the present invention.

With reference to FIGS. 3A and 3B for a schematic view of an optical lens assembly with a filter member for image taking and a series of aberration curves in accordance with the third preferred embodiment of the present invention respectively, the optical lens assembly with a filter member for image taking primarily comprises four lens elements, an aperture stop 302 and a filter member 301. More specifically, the optical lens assembly with a filter member for image taking, sequentially arranged from an object side to an image side along an optical axis, comprises: the filter member 301 made of plate blue glass for filtering infrared light; the aperture stop 302; the plastic first lens element 310 with positive refractive power having a convex object-side surface 311 and a concave image-side surface 312, and both object-side surface 311 and image-side surface 312 thereof being aspheric; the plastic second lens element 320 with negative refractive power having a concave object-side surface 321 and a concave image-side surface 322, and both object-side surface 321 and image-side surface 322 being aspheric; the plastic third lens element 330 with positive refractive power having a concave object-side surface 331 and a convex image-side surface 332, and both object-side surface 331 and image-side surface 332 thereof being aspheric; the plastic fourth lens element 340 with negative refractive power having a convex object-side surface 341 and a concave image-side surface 342, both object-side surface 341 and image-side surface 342 thereof being aspheric, and at least one of the object-side surface 341 and image-side surface 342 thereof having at least one inflection point; an image sensor 380 at an image plane 370. With a combination of the lens assembly 30 having four lens elements, the aperture stop 302 and the filter member 301, an image of a photographed object can be formed onto the image sensor 380.

TABLE 7

Optical data of this preferred embodiment
f = 3.31 mm, Fno = 2.82, HFOV = 34.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.300 | Glass | 1.527 | 64.2 | — |
| 2 | | Plano | 0.189 | (Blue Glass) | | | |
| 3 | Ape. Stop | Plano | −0.139 | | | | |
| 4 | Lens 1 | 1.108640 (ASP) | 0.552 | Plastic | 1.543 | 56.5 | 2.28 |
| 5 | | 8.781800 (ASP) | 0.124 | | | | |
| 6 | Lens 2 | −40.314100 (ASP) | 0.315 | Plastic | 1.632 | 23.4 | −4.19 |
| 7 | | 2.841350 (ASP) | 0.419 | | | | |
| 8 | Lens 3 | −1.722800 (ASP) | 0.695 | Plastic | 1.543 | 56.5 | 2.46 |
| 9 | | −0.859470 (ASP) | 0.061 | | | | |
| 10 | Lens 4 | 6.736100 (ASP) | 0.555 | Plastic | 1.530 | 55.8 | −2.47 |
| 11 | | 1.066010 (ASP) | 0.346 | | | | |
| 12 | Image | Plano | 0.734 | | | | |
| 13 | | Plano | — | | | | |

Note:
Reference wavelength is 587.6 nm. ASP stands for aspherical surfaces.

The optical data of this preferred embodiment are listed in Table 7, wherein the object-side surfaces and the image-side surfaces of the first lens element 310 to the fourth lens element 340 comply with the aspherical surface formula as given in Equation (10), and their aspheric coefficients are listed in Table 8 as follows:

TABLE 8

Aspheric coefficients of this preferred embodiment

| Surface # | 4 | 5 | 6 | 7 |
|---|---|---|---|---|
| k = | −7.84671E−02 | 5.86239E+01 | −7.18107E+01 | 2.73933E+00 |
| A4 = | 4.29489E−02 | 4.55646E−02 | 9.10820E−02 | 2.04694E−01 |
| A6 = | −7.95509E−02 | −5.23841E−01 | −1.05545E+00 | −2.71891E−01 |
| A8 = | 4.06059E−01 | 1.39097E+00 | 1.63418E+00 | 1.86590E−01 |
| A10 = | −5.45071E−01 | −4.00419E+00 | −1.43934E+00 | 2.27613E−01 |
| A12 = | | | −5.38754E+00 | |

| Surface # | 8 | 9 | 10 | 11 |
|---|---|---|---|---|
| k = | −8.04563E−01 | −1.64642E+00 | −8.84235E+02 | −8.61061E+00 |
| A4 = | 4.78653E−02 | 7.78954E−02 | −1.08715E−01 | −1.28647E−01 |
| A6 = | 7.93853E−02 | −7.06319E−03 | 3.61741E−02 | 3.94249E−02 |
| A8 = | −3.33975E−01 | −5.00295E−02 | −1.41644E−04 | −9.68117E−03 |
| A10 = | −2.17938E−01 | −3.70110E−02 | 4.06906E−05 | 6.39029E−04 |
| A12 = | 4.88065E−01 | 5.18394E−02 | −4.27372E−04 | 8.20457E−05 |
| A14 = | 8.38250E−01 | 3.77629E−02 | −1.22121E−05 | −3.53273E−06 |
| A16 = | −1.26623E+00 | −3.26736E−02 | 1.84618E−05 | −5.45623E−07 |

With reference to Table 7 and the series of aberration curves as shown in FIG. 3B for the optical lens assembly with a filter member for image taking in accordance with this preferred embodiment, the focal length of the optical lens assembly for image capture is f=3.31 (mm), the overall aperture value (f-number) of the optical lens assembly for image capture is Fno=2.82, the half of maximum view angle is HFOV=34.2°. After the optical data of this preferred embodiment are calculated and derived, the optical lens assembly satisfies related relations as shown in Table 9 below, and the related symbols have been described above and thus will not be described again.

TABLE 9

Data of related relations of this preferred embodiment

| Relation | Data |
|---|---|
| $v_1-v_2$ | 33.1 |
| FT | 0.30 |

TABLE 9-continued

Data of related relations of this preferred embodiment

| Relation | Data |
|---|---|
| $D_1$ | 0.05 |
| $f_3/f$ | 0.74 |
| $|f/f_3|$ | 1.35 |
| $f_4/f$ | −0.75 |
| SL/TTL | 0.96 |
| TTL/ImgH | 1.68 |

According to the optical data as shown in Table 7 and the series of aberration curves as shown in FIG. 3B, the optical lens assembly with a filter member for image taking in accordance with this preferred embodiment of the present invention provides good correction results in aspects of the longitudinal spherical aberration, astigmatic field curving, and distortion.

Fourth Preferred Embodiment

Figure 4B:
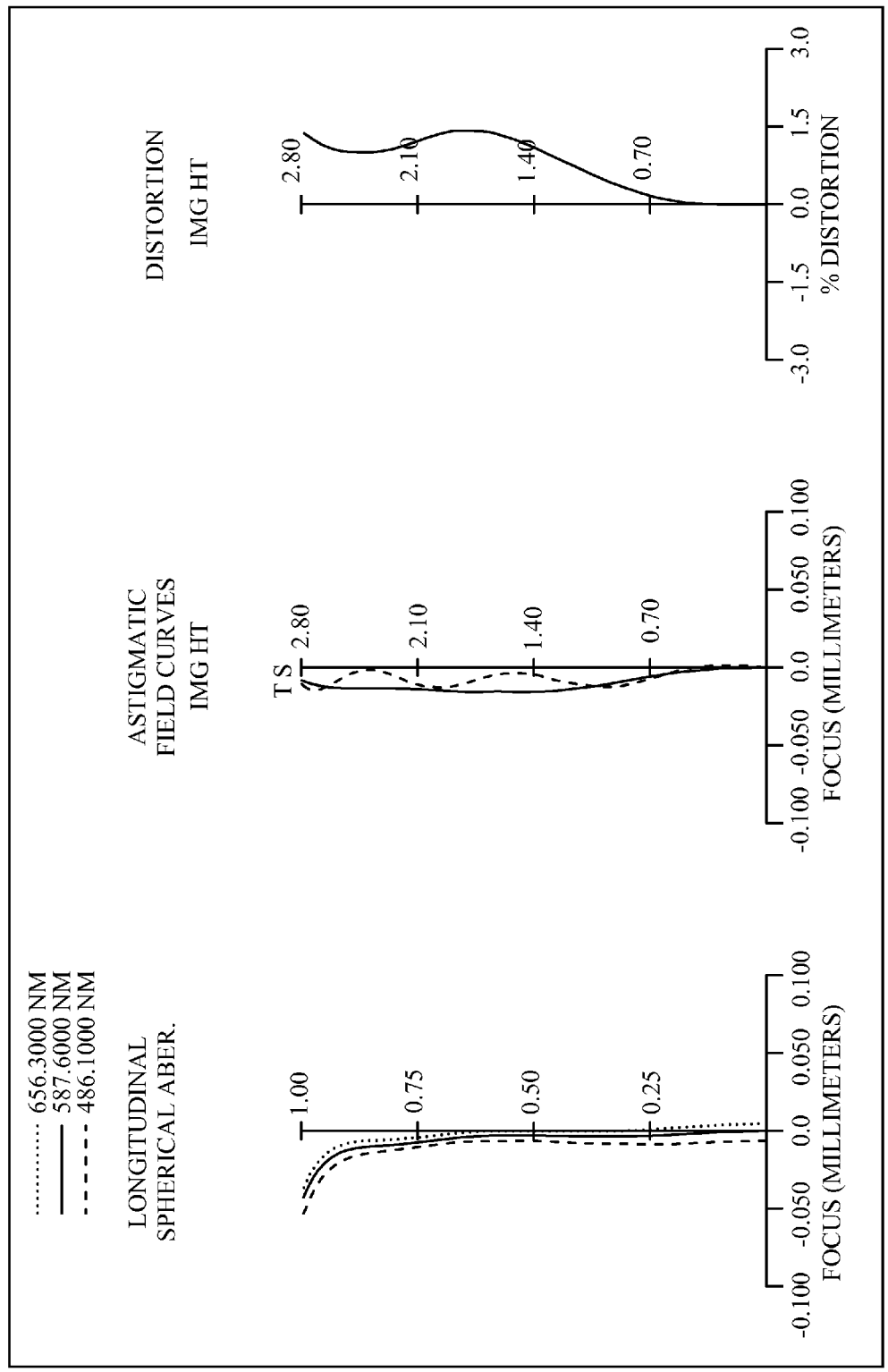
FIG. 4B is a series of aberration curves of the fourth preferred embodiment of the present invention.

With reference to FIGS. 4A and 4B for a schematic view of an optical lens assembly with a filter member for image taking and a series of aberration curves in accordance with the fourth preferred embodiment of the present invention respectively, the optical lens assembly with a filter member for image taking mainly comprises five lens elements, an aperture stop 402 and a filter member 401. More specifically, the optical lens assembly with a filter member for image taking, sequentially arranged from an object side to an image side along an optical axis, comprises: the filter member 401 made of plate blue glass for filtering infrared light; the plastic first lens element 410 with positive refractive power having a convex object-side surface 411 and a convex image-side surface 412, and both object-side surface 411 and image-side surface 412 thereof being aspheric; the aperture stop 402; the plastic second lens element 420 with negative refractive power having a concave object-side surface 421 and a concave image-side surface 422, and both object-side surface 421 and image-side surface 422 being aspheric; the plastic third lens element 430 with negative refractive power having a convex object-side surface 431 and a concave image-side surface 432, and both object-side surface 431 and image-side surface 432 thereof being aspheric; the plastic fourth lens element 440 with positive refractive power having a concave object-side surface 441 and a convex image-side surface 442, and both object-side surface 441 and image-side surface 442 thereof being aspheric; the plastic fifth lens element 450 with negative refractive power having a convex object-side surface 451 and a concave image-side surface 452, both object-side surface 451 and image-side surface 452 thereof being aspheric, and at least one of the object-side surface 451 and image-side surface 452 thereof having at least one inflection point; an image sensor 480 at an image plane 470. With a combination of the lens assembly 40 having five lens elements, the aperture stop 402 and the filter member 401, an image of a photographed object can be formed onto the image sensor 480.

TABLE 10

Optical data of this preferred embodiment
f = 3.61 mm, Fno = 2.40, HFOV = 37.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.210 | Glass | 1.527 | 64.2 | — |
| 2 | | Plano | 0.300 | (Blue Glass) | | | |
| 3 | Lens 1 | 1.703230 (ASP) | 0.511 | Plastic | 1.544 | 55.9 | 2.85 |
| 4 | | −15.711400 (ASP) | −0.005 | | | | |
| 5 | Ape. Stop | Plano | 0.061 | | | | |
| 6 | Lens 2 | −24.254200 (ASP) | 0.230 | Plastic | 1.640 | 23.3 | −7.43 |
| 7 | | 5.932100 (ASP) | 0.537 | | | | |
| 8 | Lens 3 | 283.270800 (ASP) | 0.230 | Plastic | 1.640 | 23.3 | −10.17 |
| 9 | | 6.356700 (ASP) | 0.214 | | | | |
| 10 | Lens 4 | −3.696400 (ASP) | 1.054 | Plastic | 1.544 | 55.9 | 1.73 |
| 11 | | −0.827400 (ASP) | 0.043 | | | | |
| 12 | Lens 5 | 29.180000 (ASP) | 0.718 | Plastic | 1.535 | 56.3 | −1.84 |
| 13 | | 0.941970 (ASP) | 0.700 | | | | |
| 14 | Image | Plano | 0.506 | | | | |
| 15 | | Plano | — | | | | |

Note:
Reference wavelength is 587.6 nm. ASP stands for aspherical surfaces.

The optical data of this preferred embodiment are listed in Table 10, wherein the object-side surfaces and the image-side surfaces of the first lens element 410 to the fifth lens element 450 comply with the aspheric surface formula as given in Equation (10), and their aspheric coefficients are listed in Table 11 as follows:

TABLE 11

Aspheric coefficients of this preferred embodiment

| Surface # | 3 | 4 | 6 | 7 | 8 |
|---|---|---|---|---|---|
| k = | −6.47951E+00 | 8.96701E+01 | 9.00000E+01 | −1.40981E+02 | −9.00000E+01 |
| A4 = | 1.56786E−01 | −9.59932E−02 | −1.11035E−01 | 2.88802E−03 | −3.67483E−01 |
| A6 = | −1.66299E−01 | 1.99200E−01 | 3.11421E−01 | −3.42378E−03 | −1.28183E−01 |
| A8 = | 2.11446E−01 | −2.89805E−01 | −1.96637E−01 | 1.74099E−01 | 4.00731E−01 |
| A10 = | −3.14829E−01 | 1.24517E−01 | −2.46469E−01 | −4.87423E−01 | −7.99676E−01 |
| A12 = | 1.85664E−01 | 2.22553E−01 | 6.69759E−01 | 5.05450E−01 | 6.16361E−01 |
| A14 = | −3.15370E−02 | −2.18273E−01 | −2.83192E−01 | −1.04265E−01 | |

| Surface # | 9 | 10 | 11 | 12 | 13 |
|---|---|---|---|---|---|
| k = | −8.97928E+01 | 6.82136E+00 | −3.36695E+00 | −9.00000E+01 | −6.09198E+00 |
| A4 = | −2.28216E−01 | 4.07812E−02 | −1.52841E−01 | −5.61676E−02 | −6.01281E−02 |

TABLE 11-continued

Aspheric coefficients of this preferred embodiment

| A6 = | 8.02348E−03 | 2.14830E−02 | 1.30576E−01 | −6.37514E−03 | 2.09422E−02 |
| --- | --- | --- | --- | --- | --- |
| A8 = | 3.49795E−02 | −1.57145E−01 | −1.09155E−01 | 7.86252E−03 | −6.66533E−03 |
| A10 = | 5.17487E−03 | 2.45062E−01 | 5.76844E−02 | −9.69980E−04 | 1.25676E−03 |
| A12 = | 1.70663E−02 | −1.48296E−01 | −1.28546E−02 | −9.42627E−05 | −1.28562E−04 |
| A14 = | | 3.35300E−02 | 7.60327E−04 | 1.80094E−05 | 5.58240E−06 |

With reference to Table 10 and the series of aberration curves as shown in FIG. 4B for the optical lens assembly with a filter member for image taking in accordance with this preferred embodiment, the focal length of the optical lens assembly for image capture is f=3.61 (mm), the overall aperture value (f-number) of the optical lens assembly for image capture is Fno=2.40, the half of maximum view angle is HFOV=37.5°. After the optical data of this preferred embodiment are calculated and derived, the optical lens assembly satisfies related relations as shown in Table 12 below, and the related symbols have been described above and thus will not be described again.

TABLE 12

Data of related relations of this preferred embodiment

| Relation | Data |
| --- | --- |
| $v_1-v_2$ | 32.6 |
| FT | 0.21 |
| $D_1$ | 0.30 |
| $f_3/f$ | −2.82 |
| $|f/f_3|$ | 0.36 |
| $f_4/f$ | 0.48 |
| SL/TTL | 0.90 |
| TTL/ImgH | 1.71 |

According to the optical data as shown in Table 10 and the series of aberration curves as shown in FIG. 4B, the optical lens assembly with a filter member for image taking in accordance with this preferred embodiment of the present invention provides good correction results in aspects of the longitudinal spherical aberration, astigmatic field curving, and distortion.

Fifth Preferred Embodiment

Figure 5A:
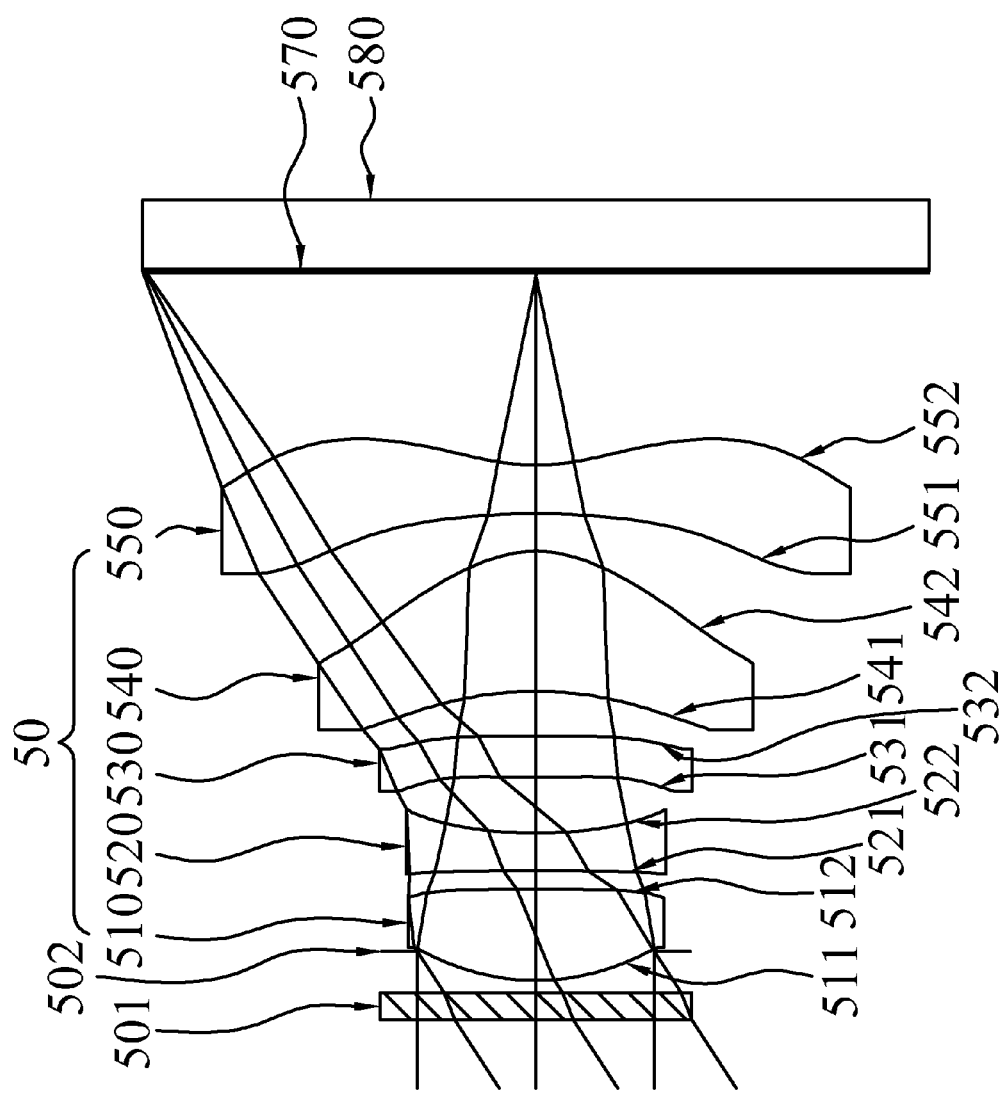
FIG. 5A is a schematic view of an optical lens assembly with a filter member for image taking in accordance with the fifth preferred embodiment of the present invention.
Figure 5B:
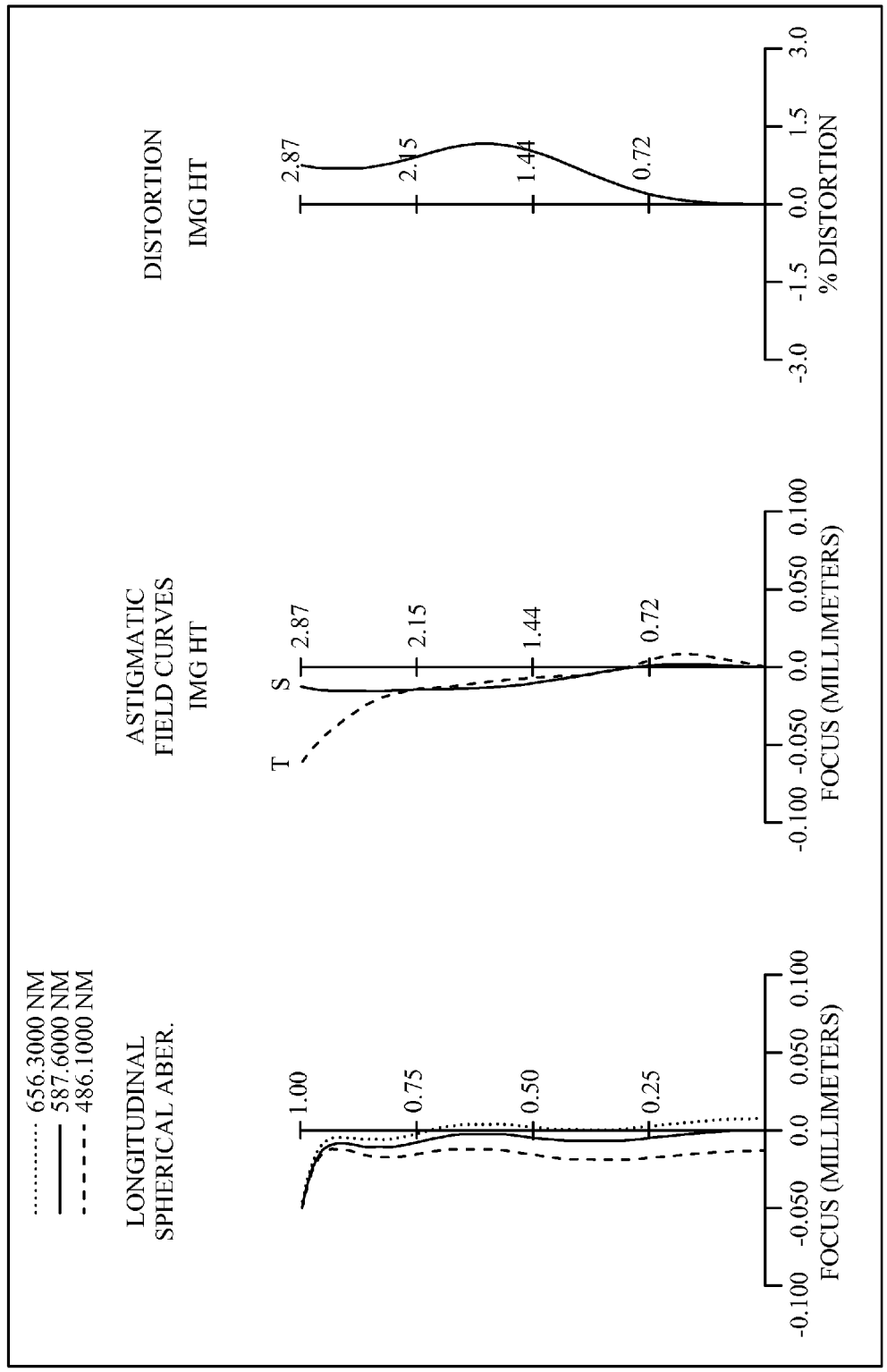
FIG. 5B is a series of aberration curves of the fifth preferred embodiment of the present invention.

With reference to FIGS. 5A and 5B for a schematic view of an optical lens assembly with a filter member for image taking and a series of aberration curves in accordance with the fifth preferred embodiment of the present invention respectively, the optical lens assembly with a filter member for image taking comprises five lens elements, an aperture stop 502 and a filter member 501. More specifically, the optical lens assembly with a filter member for image taking, sequentially arranged from an object side to an image side along an optical axis, comprises: the filter member 501 made of plate blue glass for filtering infrared light; the aperture stop 502; the plastic first lens element 510 with positive refractive power having a convex object-side surface 511 and a convex image-side surface 512, and both object-side surface 511 and image-side surface 512 thereof being aspheric; the plastic second lens element 520 with negative refractive power having a concave object-side surface 521 and a concave image-side surface 522, and both object-side surface 521 and image-side surface 522 being aspheric; the plastic third lens element 530 with positive refractive power having a convex object-side surface 531 and a concave image-side surface 532, and both object-side surface 531 and image-side surface 532 thereof being aspheric; the plastic fourth lens element 540 with positive refractive power having a concave object-side surface 541 and a convex image-side surface 542, and both object-side surface 541 and image-side surface 542 thereof being aspheric; the plastic fifth lens element 550 with negative refractive power having a concave object-side surface 551 and a concave image-side surface 552, both object-side surface 551 and image-side surface 552 thereof being aspheric, and at least one of the object-side surface 551 and image-side surface 552 thereof having at least one inflection point; an image sensor 580 at an image plane 570. With a combination of the lens assembly 50 having five lens elements, the aperture stop 502 and the filter member 501, an image of a photographed object can be formed onto the image sensor 580.

TABLE 13

Optical data of this preferred embodiment
f = 4.39 mm, Fno = 2.52, HFOV = 33.1 deg.

| Surface # | | Curvature Radius | Thickness | Material | Index | Abbe # | Focal Length |
| --- | --- | --- | --- | --- | --- | --- | --- |
| 0 | Object | Plano | Infinity | | | | |
| 1 | IR-filter | Plano | 0.200 | Glass | 1.527 | 64.2 | — |
| 2 | | Plano | 0.300 | (Blue Glass) | | | |
| 3 | Ape. Stop | Plano | −0.210 | | | | |
| 4 | Lens 1 | 1.679410 (ASP) | 0.671 | Plastic | 1.544 | 55.9 | 2.89 |
| 5 | | −21.604500 (ASP) | 0.132 | | | | |
| 6 | Lens 2 | −35.328700 (ASP) | 0.277 | Plastic | 1.640 | 23.3 | −4.52 |
| 7 | | 3.155600 (ASP) | 0.411 | | | | |
| 8 | Lens 3 | 11.212300 (ASP) | 0.297 | Plastic | 1.634 | 23.8 | 29.41 |
| 9 | | 27.838500 (ASP) | 0.333 | | | | |
| 10 | Lens 4 | −2.646860 (ASP) | 1.030 | Plastic | 1.544 | 55.9 | 1.96 |
| 11 | | −0.863860 (ASP) | 0.277 | | | | |
| 12 | Lens 5 | −4.263700 (ASP) | 0.353 | Plastic | 1.544 | 55.9 | −1.84 |
| 13 | | 1.349770 (ASP) | 0.500 | | | | |

TABLE 13-continued

Optical data of this preferred embodiment
f = 4.39 mm, Fno = 2.52, HFOV = 33.1 deg.

| Surface # | | Curvature Radius | Thickness | Material | Index | Abbe # | Focal Length |
|---|---|---|---|---|---|---|---|
| 14 | Image | Plano | 0.926 | | | | |
| 15 | | Plano | — | | | | |

Note:
Reference wavelength is 587.6 nm. ASP stands for aspherical surfaces.

The optical data of this preferred embodiment are listed in Table 13, wherein the object-side surfaces and the image-side surfaces of the first lens element 510 to the fifth lens element 550 comply with the aspherical surface formula as given in Equation (10), and their aspheric coefficients are listed in Table 14 as follows:

TABLE 14

Aspheric coefficients of this preferred embodiment

| Surface # | 4 | 5 | 6 | 7 | 8 |
|---|---|---|---|---|---|
| k = | −7.72650E+00 | 7.26990E+01 | −9.00000E+01 | 3.76813E+00 | 9.00000E+01 |
| A4 = | 1.98676E−01 | −2.22201E−02 | −1.89633E−02 | −3.84114E−02 | −1.37560E−01 |
| A6 = | −1.82870E−01 | 4.51462E−02 | 1.50759E−02 | 5.45918E−02 | −1.43251E−01 |
| A8 = | 1.43397E−01 | −1.94687E−01 | 2.21839E−02 | 1.32249E−01 | 2.43076E−01 |
| A10 = | −3.39137E−02 | 2.88683E−01 | −6.55521E−02 | −3.61348E−01 | −2.17173E−01 |
| A12 = | −6.09490E−02 | −2.74225E−01 | 6.90407E−01 | 3.48426E−01 | 9.67622E−02 |
| A14 = | 2.10345E−02 | 7.69446E−02 | −2.84876E−01 | −1.16700E−01 | |

| Surface # | 9 | 10 | 11 | 12 | 13 |
|---|---|---|---|---|---|
| k = | −2.06282E+01 | 2.79567E+00 | −3.54903E+00 | −9.00000E+01 | −1.00958E+01 |
| A4 = | −7.54199E−02 | 8.12975E−03 | −1.10737E−01 | −1.92223E−02 | −5.24129E−02 |
| A6 = | −9.84327E−02 | 8.47443E−02 | 1.10066E−01 | −2.03067E−02 | 1.17990E−02 |
| A8 = | 1.17408E−01 | −1.73371E−01 | −8.74598E−02 | 8.48103E−03 | −3.91275E−03 |
| A10 = | −4.85129E−02 | 1.96374E−01 | 4.34468E−02 | −5.65576E−04 | 9.53802E−04 |
| A12 = | 1.48649E−02 | −9.57327E−02 | −9.70903E−03 | −1.17925E−04 | −1.31503E−04 |
| A14 = | | 1.78507E−02 | 6.65638E−04 | 1.39175E−05 | 7.91164E−06 |

With reference to Table 13 and the series of aberration curves as shown in FIG. 5B for the optical lens assembly with a filter member for image taking in accordance with this preferred embodiment, the focal length of the optical lens assembly for image capture is f=4.39 (mm), the overall aperture value (f-number) of the optical lens assembly for image capture is Fno=2.52, the half of maximum view angle is HFOV=33.1°. After the optical data of this preferred embodiment are calculated and derived, the optical lens assembly satisfies related relations as shown in Table 15 below, and the related symbols have been described above and thus will not be described again.

TABLE 15

Data of related relations of this preferred embodiment

| Relation | Data |
|---|---|
| $v_1-v_2$ | 32.6 |
| FT | 0.20 |
| $D_1$ | 0.09 |
| $f_3/f$ | 6.70 |
| $|f/f_3|$ | 0.15 |
| $f_4/f$ | 0.45 |
| SL/TTL | 0.96 |
| TTL/ImgH | 1.81 |

According to the optical data as shown in Table 13 and the series of aberration curves as shown in FIG. 5B, the optical lens assembly with a filter member for image taking in accordance with this preferred embodiment of the present invention provides good correction results in aspects of the longitudinal spherical aberration, astigmatic field curving, and distortion.

Sixth Preferred Embodiment

Figure 6A:
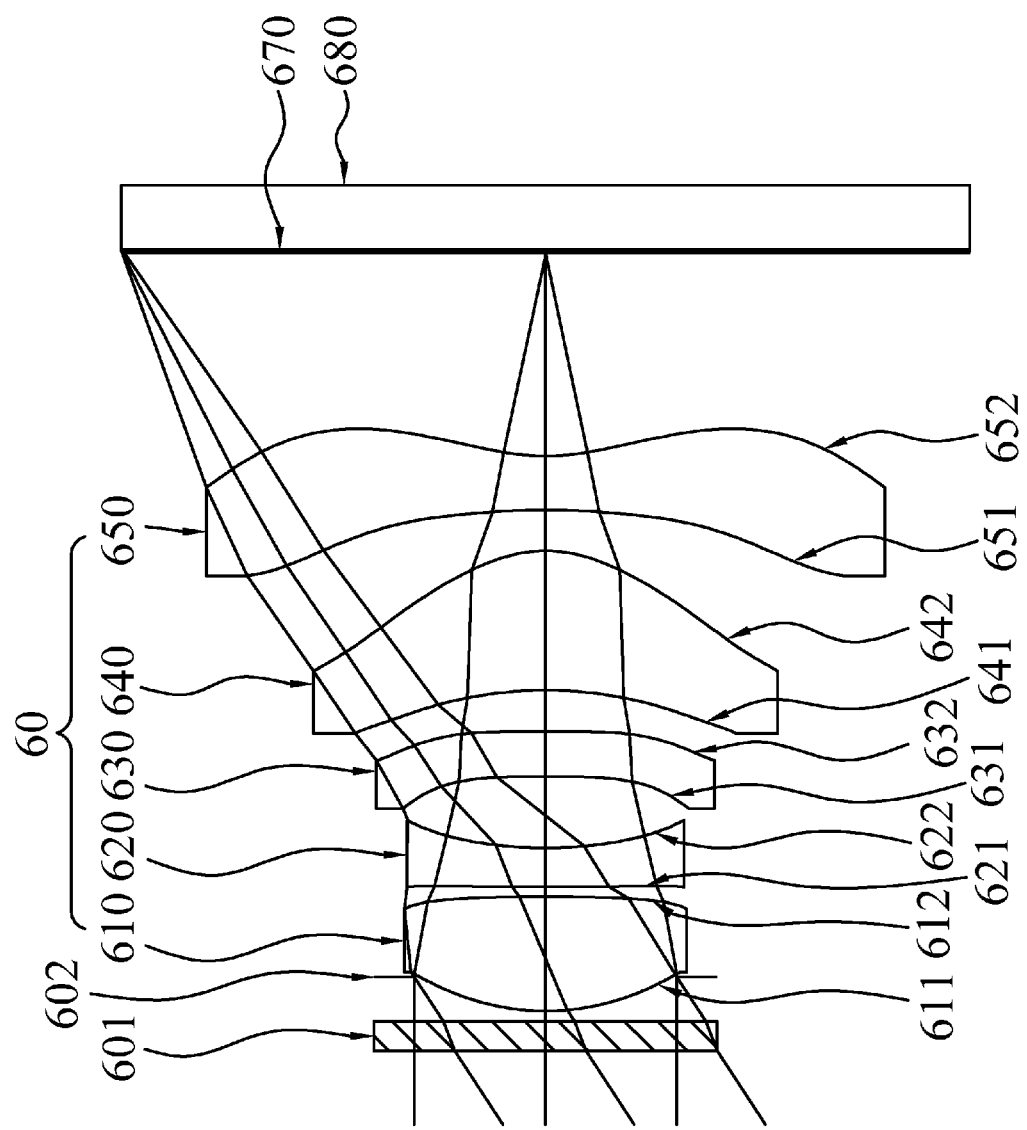
FIG. 6A is a schematic view of an optical lens assembly with a filter member for image taking in accordance with the sixth preferred embodiment of the present invention.
Figure 6B:
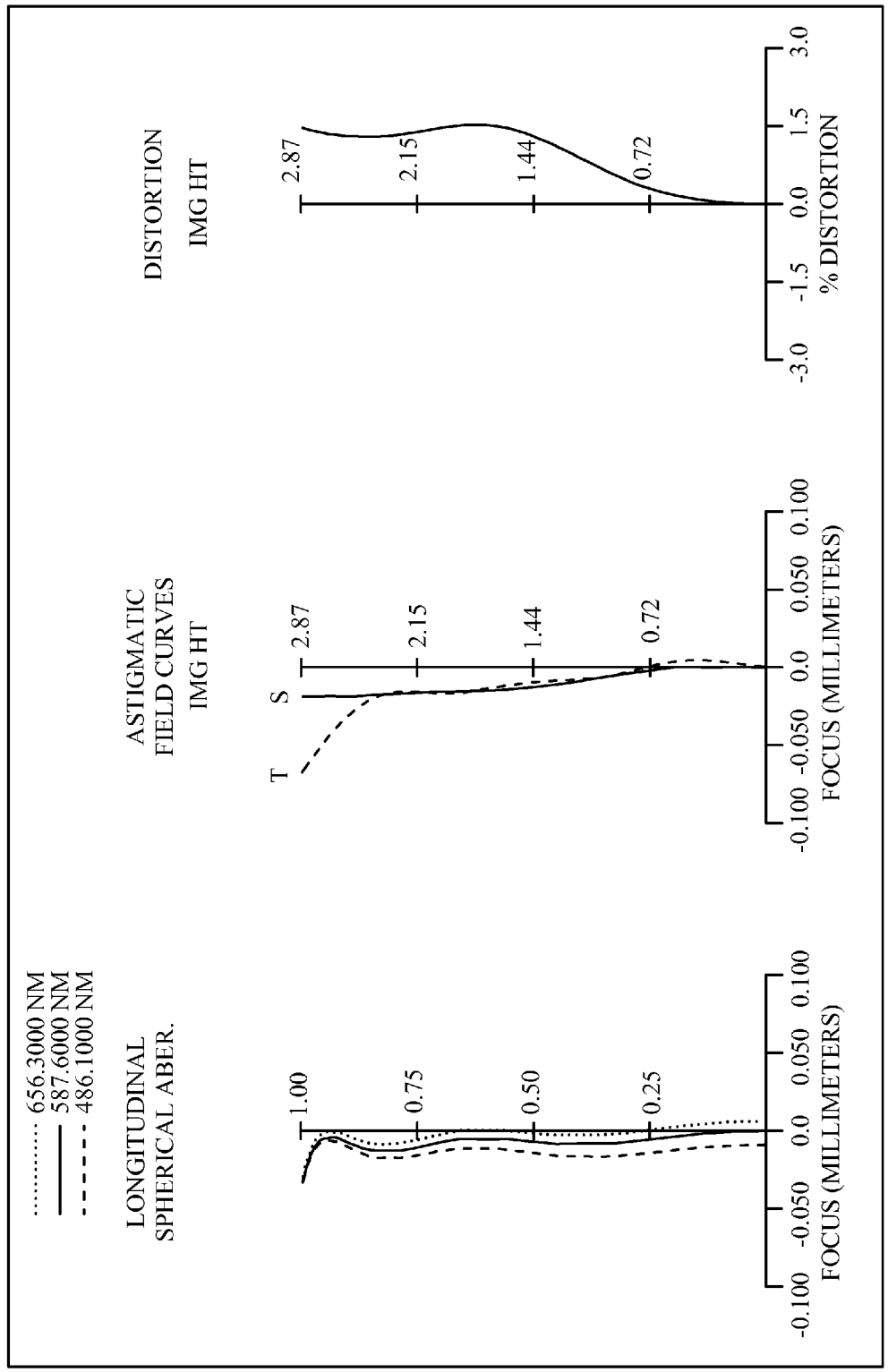
FIG. 6B is a series of aberration curves of the sixth preferred embodiment of the present invention.

With reference to FIGS. 6A and 6B for a schematic view of an optical lens assembly with a filter member for image taking and a series of aberration curves in accordance with the sixth preferred embodiment of the present invention respectively, the optical lens assembly with a filter member for image taking primarily comprises five lens elements, an aperture stop 602 and a filter member 601. More specifically, the optical lens assembly with a filter member for image taking, sequentially arranged from an object side to an image side along an optical axis, comprises: the filter member 601 made of plate blue glass for filtering infrared light; the aperture stop 602; the plastic first lens element 610 with positive refractive power has a convex object-side surface 611 and a convex image-side surface 612, and both object-side surface 611 and image-side surface 612 thereof being aspheric; the plastic second lens element 620 with negative refractive power having a convex object-side surface 621 and a concave image-side surface 622, and both object-side surface 621 and image-side surface 622 being aspheric; the plastic third lens element 630 with negative refractive power having a concave object-side surface 631 and a convex image-side surface 632, and both object-side surface 631 and image-side surface 632 thereof being aspheric; the plastic fourth lens element 640 with positive refractive power having a concave object-side surface 641 and a convex image-side surface 642, and both object-side surface 641 and image-side surface 642 thereof being aspheric; the plastic fifth lens element 650 with negative refractive power having a concave object-side surface 651 and a concave image-side surface, both object-side surface 651 and image-side surface 652 thereof being aspheric, and at least one of the object-side surface 651 and image-side surface 652 thereof having at least one inflection point; an image sensor 680 at an image plane 670. With a combination of the lens assembly 60 having five lens elements, the aperture stop 602 and the filter member 601, an image of a photographed object can be formed onto the image sensor 680.

With reference to Table 16 and the series of aberration curves as shown in FIG. 6B for the optical lens assembly with a filter member for image taking in accordance with this preferred embodiment, the focal length of the optical lens assembly for image capture is f=4.36 (mm), the overall aperture value (f-number) of the optical lens assembly for image capture is Fno=2.45, the half of maximum view angle is

TABLE 16

Optical data of this preferred embodiment
f = 4.36 mm, Fno = 2.45, HFOV = 33.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.200 | Glass | 1.527 | 64.2 | — |
| 2 | | Plano | 0.300 | (Blue Glass) | | | |
| 3 | Ape. Stop | Plano | −0.230 | | | | |
| 4 | Lens 1 | 1.642070 (ASP) | 0.775 | Plastic | 1.544 | 55.9 | 2.74 |
| 5 | | −13.746800 (ASP) | 0.068 | | | | |
| 6 | Lens 2 | 100.000000 (ASP) | 0.262 | Plastic | 1.634 | 23.8 | −4.66 |
| 7 | | 2.868090 (ASP) | 0.484 | | | | |
| 8 | Lens 3 | −14.912000 (ASP) | 0.306 | Plastic | 1.634 | 23.8 | −52.83 |
| 9 | | −27.094000 (ASP) | 0.278 | | | | |
| 10 | Lens 4 | −2.746930 (ASP) | 0.945 | Plastic | 1.544 | 55.9 | 1.98 |
| 11 | | −0.867770 (ASP) | 0.277 | | | | |
| 12 | Lens 5 | −4.612100 (ASP) | 0.365 | Plastic | 1.544 | 55.9 | −1.93 |
| 13 | | 1.394850 (ASP) | 0.500 | | | | |
| 14 | Image | Plano | 0.891 | | | | |
| 15 | | Plano | — | | | | |

Note:
Reference wavelength is 587.6 nm. ASP stands for aspherical surfaces.

The optical data of this preferred embodiment are listed in Table 16, wherein the object-side surfaces and the image-side surfaces of the first lens element 610 to the fifth lens element 650 comply with the aspherical surface formula as given in Equation (10), and their aspheric coefficients are listed in Table 17 as follows:

HFOV=33.1°. After the optical data of this preferred embodiment are calculated and derived, the optical lens assembly satisfies related relations as shown in Table 18 below, and the related symbols have been described above and thus will not be described again.

TABLE 17

Aspheric coefficients of this preferred embodiment

| Surface # | 4 | 5 | 6 | 7 | 8 |
|---|---|---|---|---|---|
| k = | −7.37794E+00 | 3.24959E+01 | −9.00000E+01 | 3.58896E+00 | −9.00000E+01 |
| A4 = | 2.02964E−01 | −2.15843E−02 | −1.81672E−02 | −3.37616E−02 | −1.66744E−01 |
| A6 = | −1.82197E−01 | 5.47852E−02 | 1.88546E−02 | 4.30220E−02 | −1.66738E−01 |
| A8 = | 1.40829E−01 | −2.01289E−01 | 2.31330E−01 | 1.37918E−01 | 2.42464E−01 |
| A10 = | −2.95269E−02 | 2.84783E−01 | −6.57780E−01 | −3.47932E−01 | −2.15533E−01 |
| A12 = | −5.75372E−02 | −2.67407E−01 | 6.83637E−01 | 3.36467E−01 | 9.34803E−02 |
| A14 = | 2.10345E−02 | 7.69446E−02 | −2.84876E−01 | −1.16700E−01 | |

| Surface # | 9 | 10 | 11 | 12 | 13 |
|---|---|---|---|---|---|
| k = | −9.00000E+01 | 3.00717E+00 | −3.40417E+00 | −8.88210E+01 | −1.03637E+01 |
| A4 = | −1.05300E−01 | 2.43484E−03 | −1.16275E−01 | −1.90910E−02 | −5.33233E−02 |
| A6 = | −1.01983E−01 | 8.28282E−02 | 1.13406E−01 | −2.03240E−02 | 1.17970E−02 |
| A8 = | 1.16308E−01 | −1.73314E−01 | −8.72395E−02 | 8.46071E−03 | −3.90282E−03 |
| A10 = | −4.83787E−02 | 1.96304E−01 | 4.33763E−02 | −5.69618E−04 | 9.49146E−04 |
| A12 = | 1.60930E−02 | −9.58341E−02 | −9.72933E−03 | −1.18095E−04 | −1.32178E−04 |
| A14 = | | 1.78418E−02 | 6.55676E−04 | 1.41063E−05 | 8.07987E−06 |

TABLE 18

Data of related relations of this preferred embodiment

| Relation | Data |
|---|---|
| $v_1-v_2$ | 32.1 |
| FT | 0.20 |
| $D_1$ | 0.07 |
| $f_3/f$ | −12.11 |
| $|f/f_3|$ | 0.08 |
| $f_4/f$ | 0.45 |

TABLE 18-continued

Data of related relations of this preferred embodiment

| Relation | Data |
|---|---|
| SL/TTL | 0.96 |
| TTL/ImgH | 1.79 |

According to the optical data as shown in Table 16 and the series of aberration curves as shown in FIG. 6B, the optical lens assembly with a filter member for image taking in accordance with this preferred embodiment of the present invention provides good correction results in aspects of the longitudinal spherical aberration, astigmatic field curving, and distortion.

Seventh Preferred Embodiment

Figure 7B:
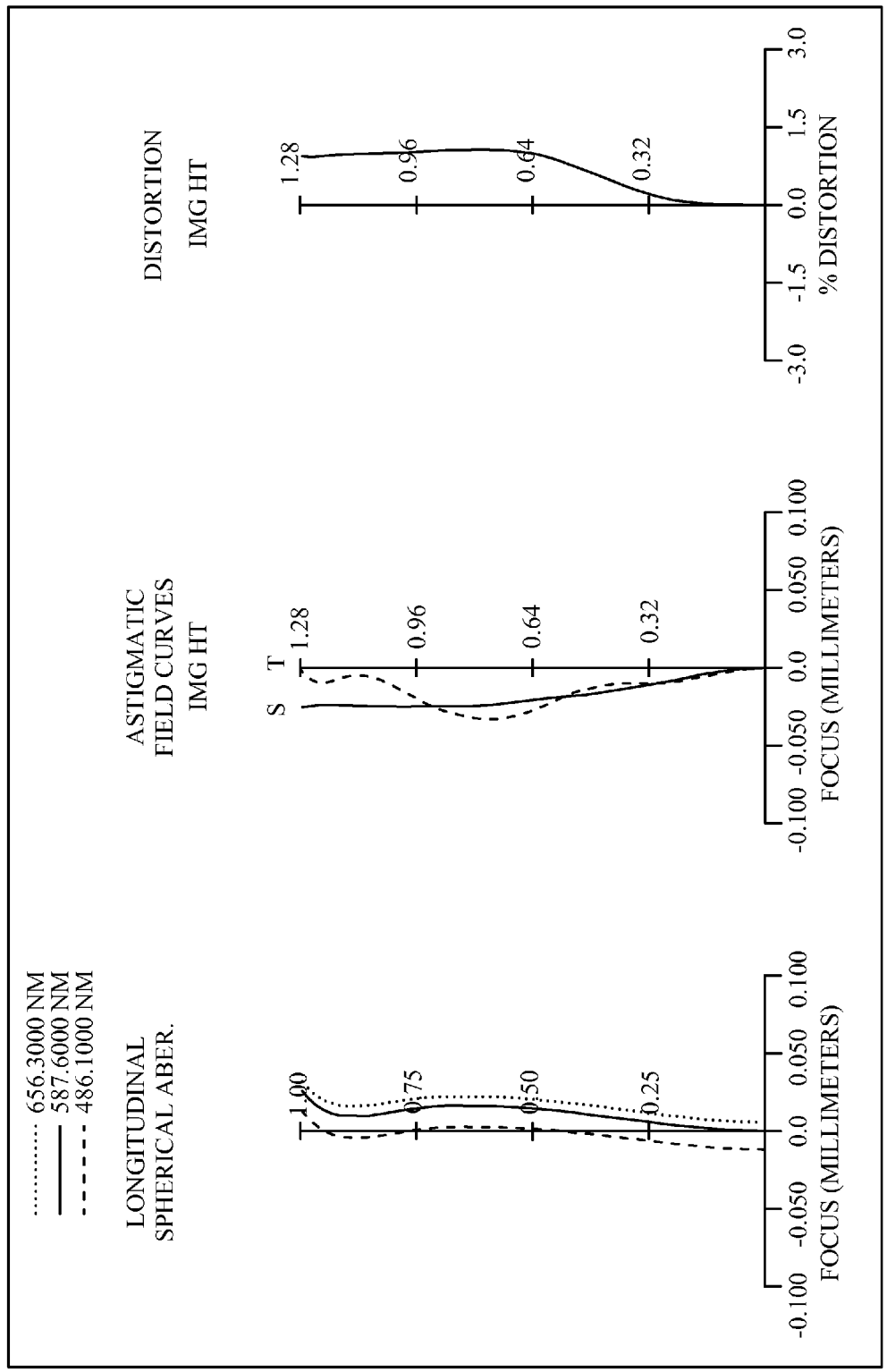
FIG. 7B is a series of aberration curves of the seventh preferred embodiment of the present invention.

With reference to FIGS. 7A and 7B for a schematic view of an optical lens assembly with a filter member for image taking and a series of aberration curves in accordance with the seventh preferred embodiment of the present invention respectively, the optical lens assembly with a filter member for image taking mainly comprises three lens elements, an aperture stop 702 and a filter member 701. More specifically, the optical lens assembly with a filter member for image taking, sequentially arranged from an object side to an image side along an optical axis, comprises: the filter member 701 made of plate blue glass for filtering infrared light; the aperture stop 702; the plastic first lens element 710 with positive refractive power having a convex object-side surface 711 and a concave image-side surface 712, and both object-side surface 711 and image-side surface 712 thereof being aspheric; the plastic second lens element 720 with negative refractive power having a concave object-side surface 721 and a convex image-side surface 722, and both object-side surface 721 and image-side surface 722 being aspheric; the plastic third lens element 730 with positive refractive power having a convex object-side surface 731 and a concave image-side surface 732, both object-side surface 731 and image-side surface 732 thereof being aspheric; an image sensor 780 at an image plane 770. With a combination of the lens assembly 70 having three lens elements, the aperture stop 702 and the filter member 701, an image of a photographed object can be formed onto the image sensor 780.

TABLE 19

Optical data of this preferred embodiment
f = 1.73 mm, Fno = 2.40, HFOV = 36.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.200 | Glass | 1.527 | 64.2 | — |
| 2 | | Plano | 0.200 | (Blue Glass) | | | |
| 3 | Ape. Stop | Plano | −0.071 | | | | |
| 4 | Lens 1 | 0.753640 (ASP) | 0.365 | Plastic | 1.544 | 55.9 | 1.56 |
| 5 | | 5.688800 (ASP) | 0.221 | | | | |
| 6 | Lens 2 | −0.755660 (ASP) | 0.250 | Plastic | 1.634 | 23.8 | −3.96 |
| 7 | | −1.219530 (ASP) | 0.197 | | | | |
| 8 | Lens 3 | 0.798670 (ASP) | 0.416 | Plastic | 1.544 | 55.9 | 7.02 |
| 9 | | 0.824550 (ASP) | 0.200 | | | | |
| 10 | Image | Plano | 0.456 | | | | |
| 11 | | Plano | — | | | | |

Note:
Reference wavelength is 587.6 nm. ASP stands for aspherical surfaces.

The optical data of this preferred embodiment are listed in Table 19, wherein the object-side surfaces and the image-side surfaces of the first lens element 710 to the third lens element 730 comply with the aspherical surface formula as given in Equation (10), and their aspheric coefficients are listed in Table 20 as follows:

TABLE 20

Aspheric coefficients of this preferred embodiment

| Surface # | 4 | 5 | 6 |
|---|---|---|---|
| k = | 1.66465E−02 | −1.00000E+00 | 5.38499E−01 |
| A4 = | −4.04314E−01 | −6.14790E−01 | −4.92235E−02 |
| A6 = | 4.08221E+00 | 1.04601E+00 | −1.42466E+01 |
| A8 = | −4.37025E+01 | −4.80339E+01 | 1.65851E+02 |
| A10 = | 2.71636E+02 | 2.70982E+02 | −4.83515E+02 |
| A12 = | −9.58761E+02 | −9.19876E+02 | −3.17740E+02 |
| A14 = | | | |

| Surface # | 7 | 8 | 9 |
|---|---|---|---|
| k = | 9.20873E−01 | −1.45503E+00 | −1.16469E+00 |
| A4 = | −1.60768E+00 | −2.66713E+00 | −1.58422E+00 |
| A6 = | 8.44503E+00 | 5.78314E+00 | 2.44305E+00 |
| A8 = | −2.02193E+01 | −8.05417E+00 | −2.81651E+00 |
| A10 = | 1.47095E+02 | 6.68337E+00 | 1.47976E+00 |
| A12 = | −3.01063E+02 | −2.34007E+00 | 5.23171E−01 |
| A14 = | 1.71502E+01 | | −1.17564E+00 |
| A16 = | | | 4.51793E−01 |

With reference to Table 19 and the series of aberration curves as shown in FIG. 7B for the optical lens assembly with a filter member for image taking in accordance with this preferred embodiment, the focal length of the optical lens assembly for image capture is f=1.73 (mm), the overall aperture value (f-number) of the optical lens assembly for image capture is Fno=2.40, the half of maximum view angle is HFOV=36.2°. After the optical data of this preferred embodiment are calculated and derived, the optical lens assembly satisfies related relations as shown in Table 21 below, and the related symbols have been described above and thus will not be described again.

TABLE 21

Data of related relations of this preferred embodiment

| Relation | Data |
|---|---|
| $v_1-v_2$ | 32.1 |
| FT | 0.20 |
| $D_1$ | 0.13 |
| $f_3/f$ | 4.06 |
| $|f/f_3|$ | 0.25 |

TABLE 21-continued

Data of related relations of this preferred embodiment

| Relation | Data |
|---|---|
| $f_4/f$ | — |
| SL/TTL | 0.97 |
| TTL/ImgH | 1.64 |

According to the optical data as shown in Table 19 and the series of aberration curves as shown in FIG. 7B, the optical lens assembly with a filter member for image taking in accordance with this preferred embodiment of the present invention provides good correction results in aspects of the longitudinal spherical aberration, astigmatic field curving, and distortion.

Eighth Preferred Embodiment

Figure 8A:
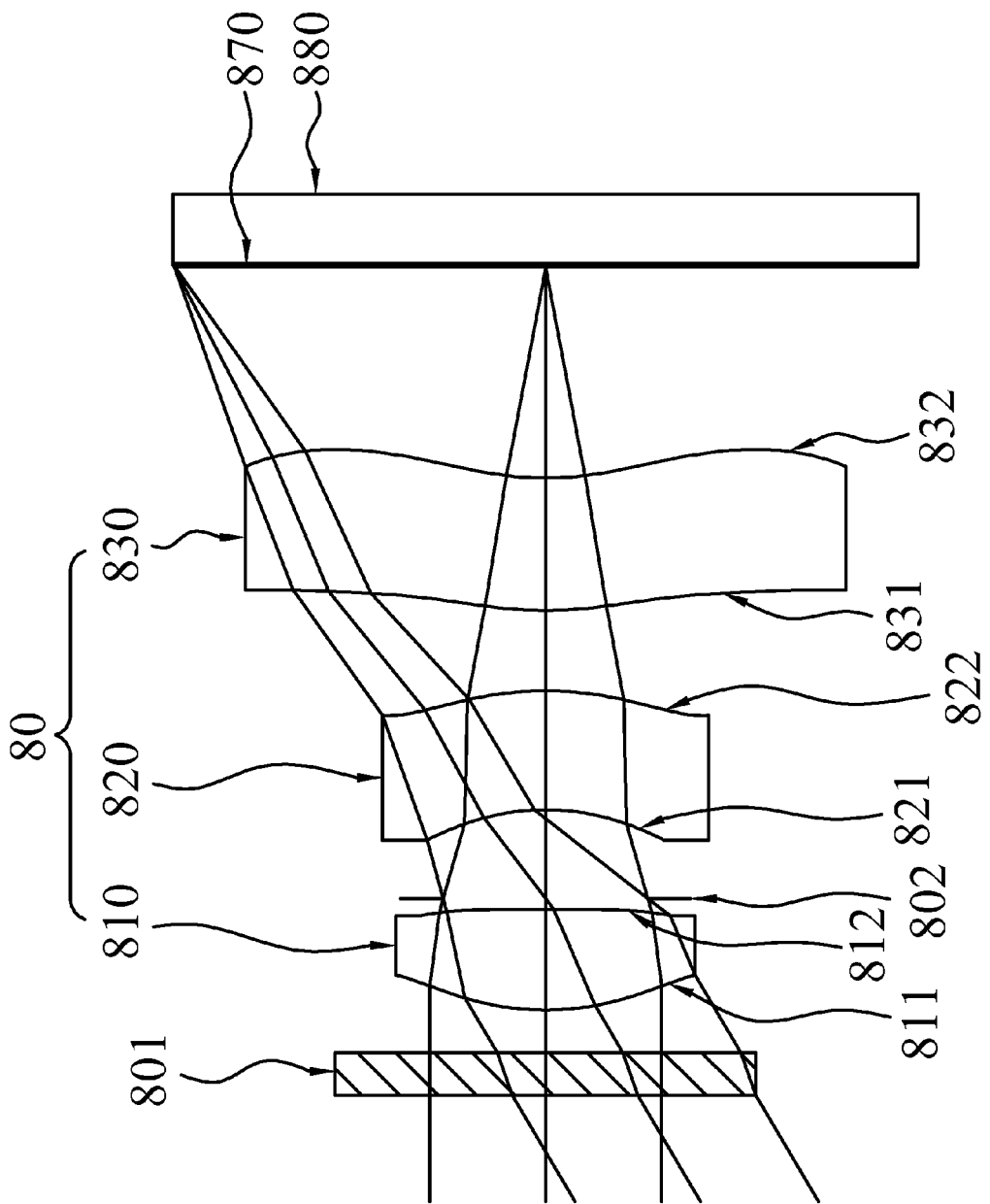
FIG. 8A is a schematic view of an optical lens assembly with a filter member for image taking in accordance with the eighth preferred embodiment of the present invention.
Figure 8B:
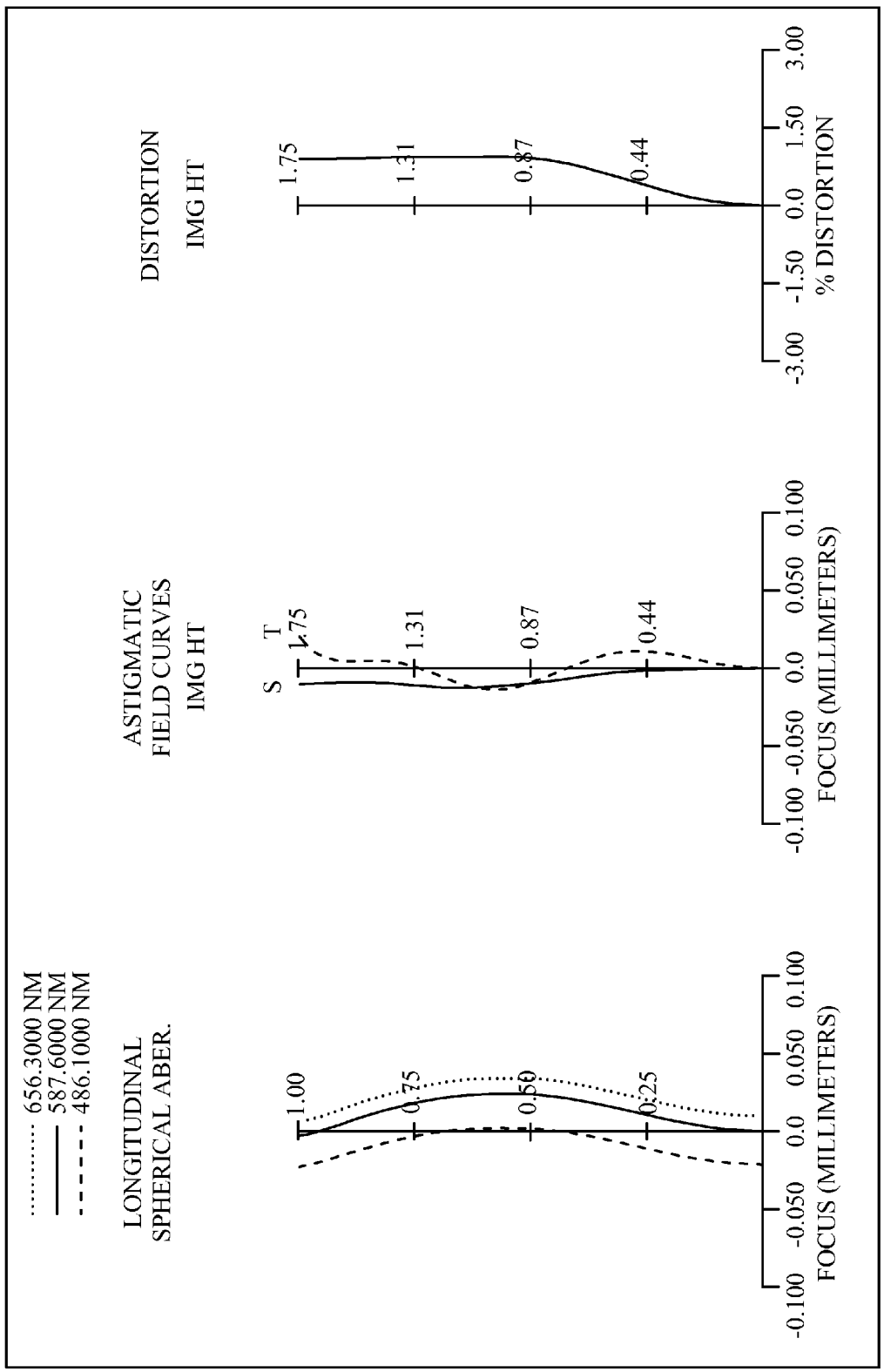
FIG. 8B is a series of aberration curves of the eighth preferred embodiment of the present invention.

With reference to FIGS. 8A and 8B for a schematic view of an optical lens assembly with a filter member for image taking and a series of aberration curves in accordance with the eighth preferred embodiment of the present invention respectively, the optical lens assembly with a filter member for image taking comprises three lens elements, an aperture stop 802 and a filter member 801. More specifically, the optical lens assembly with a filter member for image taking, sequentially arranged from an object side to an image side along an optical axis, comprises: the filter member 801 made of plate blue glass for filtering infrared light; the plastic first lens element 810 with positive refractive power having a convex object-side surface 811 and a convex image-side surface 812, and both object-side surface 811 and image-side surface 812 thereof being aspheric; the aperture stop 802; the plastic second lens element 820 with negative refractive power having a concave object-side surface 821 and a convex image-side surface 822, and both object-side surface 821 and image-side surface 822 being aspheric; the plastic third lens element 830 with negative refractive power having a convex object-side surface 831 and a concave image-side surface 832, and both object-side surface 831 and image-side surface 832 thereof being aspheric; an image sensor 880 at an image plane 870. With a combination of the lens assembly 80 having three lens elements, the aperture stop 802 and the filter member 801, an image of a photographed object can be formed onto the image sensor 880.

TABLE 22

Optical data of this preferred embodiment
f = 2.94 mm, Fno = 2.70, HFOV = 30.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | IR-filter | Plano | 0.200 | Glass | 1.527 | 64.2 | — |
| 2 | | Plano | 0.200 | (Blue Glass) | | | |
| 3 | Lens 1 | 1.282840 (ASP) | 0.474 | Plastic | 1.544 | 55.9 | 2.25 |
| 4 | | −22.925300 (ASP) | 0.050 | | | | |
| 5 | Ape. Stop | Plano | 0.417 | | | | |
| 6 | Lens 2 | −1.070460 (ASP) | 0.558 | Plastic | 1.634 | 23.8 | −8.42 |
| 7 | | −1.610550 (ASP) | 0.378 | | | | |
| 8 | Lens 3 | 1.718060 (ASP) | 0.622 | Plastic | 1.544 | 55.9 | −34.42 |
| 9 | | 1.372940 (ASP) | 0.150 | | | | |
| 10 | Image | Plano | 0.851 | | | | |
| 11 | | Plano | — | | | | |

Note:
Reference wavelength is 587.6 nm. ASP stands for aspherical surfaces.

The optical data of this preferred embodiment are listed in Table 22, wherein the object-side surfaces and the image-side surfaces of the first lens element 810 to the third lens element 830 comply with the aspherical surface formula as given in Equation (10), and their aspheric coefficients are listed in Table 23 as follows:

TABLE 23

Aspheric coefficients of this preferred embodiment

| Surface # | 3 | 4 | 6 |
|---|---|---|---|
| k = | −2.10302E+00 | −1.00000E+00 | −2.10480E+00 |
| A4 = | 6.75735E−02 | −8.35282E−02 | −1.38864E−01 |
| A6 = | −3.00918E−02 | −6.47450E−01 | −3.37031E−01 |
| A8 = | −4.45068E−01 | 2.26279E+00 | 6.53346E+00 |
| A10 = | 5.43769E−01 | −6.36902E+00 | −2.38737E+01 |
| A12 = | −1.22982E+00 | 6.34885E+00 | 2.69489E+01 |

| Surface # | 7 | 8 | 9 |
|---|---|---|---|
| k = | −8.88432E−01 | −7.57509E+00 | −3.64413E+00 |
| A4 = | −3.29976E−02 | −2.80096E−01 | −2.63554E−01 |
| A6 = | 1.63907E−01 | 2.32627E−01 | 1.83097E−01 |
| A8 = | 1.21603E+00 | −8.18684E−02 | −9.65356E−02 |
| A10 = | −1.99991E+00 | 9.86180E−03 | 2.97536E−02 |
| A12 = | 9.93607E−01 | −1.40742E−05 | −4.05589E−03 |

With reference to Table 22 and the series of aberration curves as shown in FIG. 8B for the optical lens assembly with a filter member for image taking in accordance with this preferred embodiment, the focal length of the optical lens assembly for image capture is f=2.94 (mm), the overall aperture value (f-number) of the optical lens assembly for image capture is Fno=2.70, the half of maximum view angle is HFOV=30.5°. After the optical data of this preferred embodiment are calculated and derived, the optical lens assembly satisfies related relations as shown in Table 24 below, and the related symbols have been described above and thus will not be described again.

TABLE 24

Data of related relations of this preferred embodiment

| Relation | Data |
|---|---|
| $v_1-v_2$ | 32.5 |
| FT | 0.20 |
| $D_1$ | 0.20 |
| $f_3/f$ | −11.71 |
| $|f/f_3|$ | 0.09 |
| $f_4/f$ | — |
| SL/TTL | 0.85 |
| TTL/ImgH | 2.00 |

According to the optical data as shown in Table 22 and the series of aberration curves as shown in FIG. 8B, the optical lens assembly with a filter member for image taking in accordance with this preferred embodiment of the present invention provides good correction results in aspects of the longitudinal spherical aberration, astigmatic field curving, and distortion.

The filter member as described in the foregoing preferred embodiments are made of plate blue glass, plate glass with a coating or blue glass with a coating. If the filter member is made of blue glass that can filter infrared light, the reflections can be reduced. If the filter member is made of plate glass with a coating, the production cost can be lowered effectively. The materials used for making the filter members of the aforementioned preferred embodiments are given as examples only, but the invention is not limited to such materials only.

In the optical lens assembly with a filter member for image taking of the present invention, the lens element can be made of glass or plastic. If the lens element is made of glass, the selection of the refractive power for the optical lens assembly with a filter member for image taking refractive power can be more flexible. If the lens is made of plastic, the production cost can be reduced effectively. In addition, the optical surface of the lens element is aspheric, and the aspheric surface can be easily manufactured into any shape other than those within the limitation of a spheric surface to have more control factors for eliminating aberrations, so as to reduce the number of lenses used and the total length of the optical lens assembly of the present invention.

In the optical lens assembly with a filter member for image taking of the present invention, at least one aperture stop such as a glare stop or a field stop is provided for reducing stray lights to improve the image quality.

Figure 9:
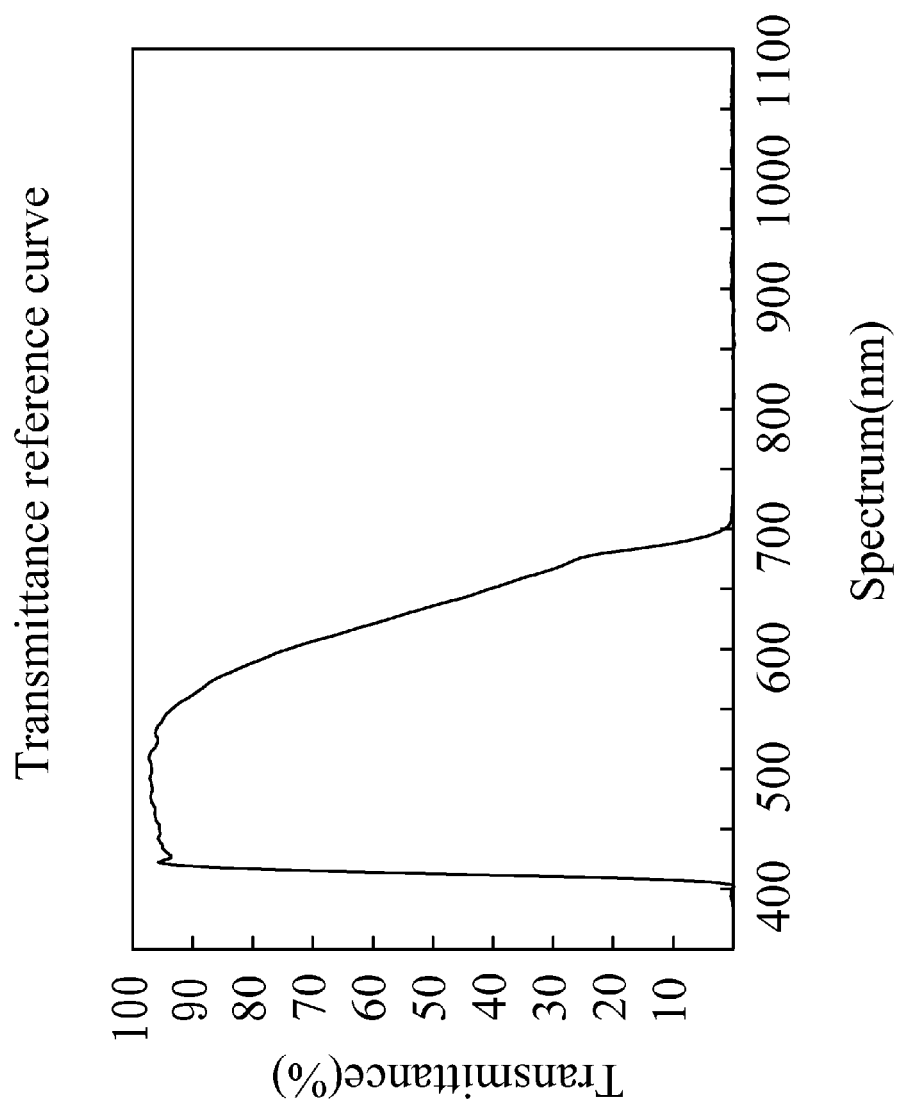
FIG. 9 is a transmittance reference curve of a filter member of the present invention.

With reference to FIG. 9 for a transmittance reference curve of a filter member of the present invention, the transmittance of an infrared band falling beyond the range of visible lights is very low, indicating that the blue glass has a good effect of absorbing the incident infrared light, and thus the optical lens assembly has a good color shift correction function. Tables 1 to 24 show changes of values of an optical lens assembly with a filter member for image taking in accordance with different preferred embodiments of the present invention respectively, and each preferred embodiment can have good correction in aspects of the longitudinal spherical aberration, astigmatic field curving, and distortion. However, the changes of values in the preferred embodiments of the present invention are obtained from experiments, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An optical lens assembly with a filter member for image taking, sequentially arranged from an object side to an image side comprising:
   a filter member, wherein the filter member comprises a blue glass that can absorb infrared light, and wherein transmittance of an incident light with wavelengths of 750 nm~1000 nm through the filter member is smaller than 20%; and
   a lens assembly, disposed at an image side of the filter member; comprising four lens elements with refractive power, sequentially arranged from the object side to the image side:
   a first lens element with positive refractive power having a convex object-side surface and a convex image-side surface;
   a second lens element with negative refractive power having a concave object-side surface and a concave image-side surface;
   a third lens element having a concave object-side surface and a convex image-side surface; and
   a fourth lens element having a concave image-side surface, and at least one of the object-side surface and the image-side surface thereof has at least one inflection point;
   wherein at least two of the four lens elements with refractive power are made of plastic with at least one aspheric object-side surface or image-side surface;
   wherein the optical lens assembly with a filter member for image taking further comprises an image sensor at an image plane; and wherein TTL is an axial distance from the object-side surface of the first lens element to the image plane, ImgH is a half of the diagonal length of an effective photosensitive area of the image sensor, and the following relation is satisfied:

$TTL/ImgH<2.10$.

2. The optical lens assembly with a filter member for image taking as recited in claim 1, wherein the transmittance of the incident light with wavelengths of 450 nm~600 nm through the filter member is greater than 60%, and for the incident light with wavelengths of 750 nm~1000 nm is smaller than 10%.

3. The optical lens assembly with a filter member for image taking as recited in claim 2, wherein $v_1$ is an Abbe number of the first lens element, $v_2$ is an Abbe number of the second lens element, and the following relation is satisfied:

$30<v_1-v_2<40$.

4. The optical lens assembly with a filter member for image taking as recited in claim 2, wherein FT is a central thickness of the filter member, and the following relation is satisfied:

$0.05\ mm<FT<0.50\ mm$.

5. The optical lens assembly with a filter member for image taking as recited in claim 2, wherein $D_1$ is an axial distance between the filter member and the first lens element, and the following relation is satisfied:

$0\ mm<D_1<0.60\ mm$.

6. The optical lens assembly with a filter member for image taking as recited in claim 2, further comprising a stop, wherein SL is an axial distance between the stop and the image plane, TTL is an axial distance from the object-side surface of the first lens element to the image plane, and the following relation is satisfied:

$0.70 < SL/TTL < 1.10$.

7. The optical lens assembly with a filter member for image taking as recited in claim 1, wherein the third lens element has positive refractive power, and the fourth lens element has negative refractive power.

8. The optical lens assembly with a filter member for image taking as recited in claim 1, wherein f is a focal length of the optical lens assembly with a filter member for image taking, $f_3$ is a focal length of the third lens element, $f_4$ is a focal length of the fourth lens element, and the following relations are satisfied:

$0.2 < f_3/f < 0.7$;

$-0.7 < f_4/f < -0.2$.

* * * * *